United States Patent
Minka et al.

(10) Patent No.: US 6,738,518 B1
(45) Date of Patent: May 18, 2004

(54) DOCUMENT IMAGE DECODING USING TEXT LINE COLUMN-BASED HEURISTIC SCORING

(75) Inventors: Thomas P. Minka, Cambridge, MA (US); Dan S. Bloomberg, Palo Alto, CA (US); Ashok C. Popat, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/570,004

(22) Filed: May 12, 2000

(51) Int. Cl.$^7$ .............................. G06K 9/68; G06K 9/62; G06K 9/46
(52) U.S. Cl. ........................ 382/218; 382/228; 382/194
(58) Field of Search ................................. 382/185, 186, 382/187, 192, 194, 209, 217, 218, 245, 226, 228, 233, 159, 309, 310, 311, 180, 174; 704/256; 706/12

(56) References Cited

U.S. PATENT DOCUMENTS

| | | | |
|---|---|---|---|
| 4,189,711 A | * 2/1980 | Frank | 382/180 |
| 5,020,112 A | 5/1991 | Chou | 382/226 |
| 5,199,077 A | 3/1993 | Wilcox et al. | 704/256 |
| 5,321,773 A | 6/1994 | Kopec et al. | 382/209 |
| 5,526,444 A | 6/1996 | Kopec et al. | 382/233 |
| 5,689,620 A | 11/1997 | Kopec et al. | 706/12 |
| 5,706,364 A | 1/1998 | Kopec et al. | 382/159 |
| 5,717,784 A | * 2/1998 | Yanagishita et al. | 382/180 |
| 5,883,986 A | 3/1999 | Kopec et al. | 382/310 |
| 6,141,443 A | * 10/2000 | Nakao et al. | 382/174 |
| 6,483,942 B1 | * 11/2002 | Curry | 382/194 |

OTHER PUBLICATIONS

Kopec et al, "Supervised Template Estimation for Document Image Decoding", Dec. 1997, IEEE Transactions on PAMI, ISBN: 0162-8828, vol. 19, No. 12, pp. 1313-1324.*

C. B. Bose and S. Kuo, "Connected and Degraded Text Recognition Using A Hidden Markov Model," *11$^{th}$ International Conference on Pattern Recognition,* The Hague Netherlands, Sep. 1992, pp. 116-118.

(List continued on next page.)

*Primary Examiner*—Mehrdad Dastouri

(57) ABSTRACT

In a text recognition system that uses a stochastic finite state network to model a document image layout, the computational efficiency of text line decoding is improved. In a typical implementation, the dynamic programming operation that accomplishes decoding uses actual scores computed between two-dimensional (2D) bitmapped character template images and the (2D) bitmapped observed image. Scoring measures the degree of a match between a character template and the observed image. Computation of these actual scores is replaced with the simpler computation of column-based (i.e., one-dimensional) heuristic scores. Because the column-based heuristic scores can be shown to be a true upper bound on actual template-image scores, the heuristic scores are accurate enough to use in place of actual scoring during text line decoding. The heuristic scores essentially reduce the expensive two-dimensional computation of the actual template-image scores required by prior decoding methods to a simpler but accurate one-dimensional computation.

10 Claims, 16 Drawing Sheets

OTHER PUBLICATIONS

F. Chen and L. Wilcox, "Wordspotting In Scanned Images Using Hidden Markov Models", *1993 IEEE International Conference on Acoustics, Speech and Signal Processing,* Minneapolis, Minn., Apr. 27–30, 1993, pp. V–1 to V–4.

P. Chou and G. Kopec, "A Stochastic Attribute Grammer Model Of Document Production And Its Use In Document Recognition," *First International Workshop on Principles of Document Processing,* Washington, D.C., Oct. 21–23, 1992.

G. Kopec, "Row–Major Scheduling Of Image Decoders," *Technical Report P92–0006 (EDL–92–5),* Xerox Palo Alto Research Center, Palo Alto, CA Jun. 1992, pp. 1–33.

G. Kopec and P. Chou, Document Image Decoding Using Markov Source Models, *IEEE Transactions on Pattern Analysis and Machine Intelligence,* vol. 16, No. 6, Jun. 1994, pp. 602–617.

A. Kam and G. Kopec, "Document Image Decoding By Heuristic Search," *IEEE Transactions on Pattern Analysis and Machine Intelligence,* vol. 18, No. 9, Sep. 1996, pp. 945–950.

F. R. Chen, D. S. Bloomberg and L. D. Wilcox, "Spotting Phrases In Lines Of Imaged Text", *Proceedings of SPIE, Document Recognition II,* vol. 2422, Feb. 1995, pp. 256–269.

G. Kopec, "Multilevel Character Templates for Document Image Decoding," *Proceedings of SPIE, Document Recognition IV,* vol. 3027, San Jose, CA, Feb. 1997, pp. 168–177.

* cited by examiner

```
*Compute 1D template column pixel count arrays
*k = total number of templates, q
m = template width in pixel columns
*n = template height in pixel rows
For i = {1, ... k} do begin
    For j = {1, ... m} do begin
        For l = {1, ... n} do begin
            Template-column-array $_{i(j)}$ =
                    Template-column-array $_{i(j)}$ + $q_{i(j,l)}$
        End
    End
End
```

```
*Compute 1D image region column pixel count array IC
 for row y in Image Z
*y= horizontal row in Image Z for which 1D array
*w= width of row y in pixel columns
*n=template height in pixel rows
For j = {1, ... w} do begin
    For l = {y-(n-1), ... y} do begin
        IC_{y(j)} = IC_{y(j)} + Z_{(j,l)}
    End
End
```

```
* Compute heuristic score for each entry in 1 x w image column
* array IC using 1 x m template column arrays;
*w = number of entries in image column array (representing number
* of pixel columns in row y)
*k = total number of template column arrays
*m = number of entries in template column array
*Initialize k x w Scores array to zero
For q = {1, ... k} do begin
   For i = {1, ... w} do begin
      For j = {1, ... m} do begin
         Scores_(q,i) = Scores_(q,i) + min (Template-column-array_(q,j) , IC_(i+(j-1)))
      End
   End
End
```

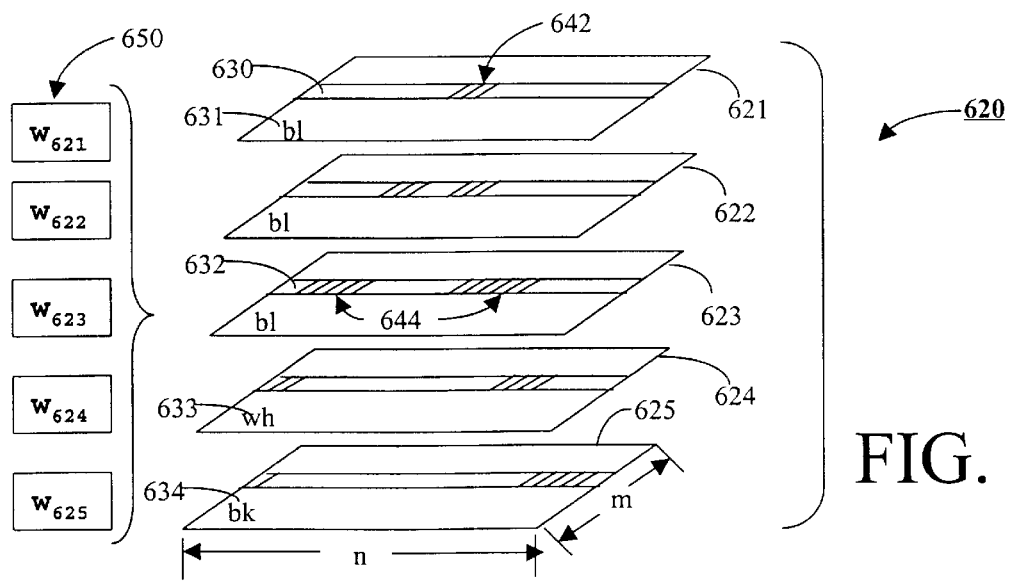

FIG. 12

```
*Compute a single entry in a single template score table
bp := number of black pixels in the image column
wp := number of white pixels in the image column
*Loop the black template levels in decreasing order of weight
p := min(bp, black pixels in the template level)
score := score + p × (level weight)
bp := bp - p
* Loop the white template levels in decreasing order of weight
* magnitude
p := (white pixels in the template level) - wp
if p > 0
    # not enough white pixels left; must match p to black pixels
    score := score + p × (level weight)
    wp := 0
else
    wp := -p
*Return score
```

FIG. 13

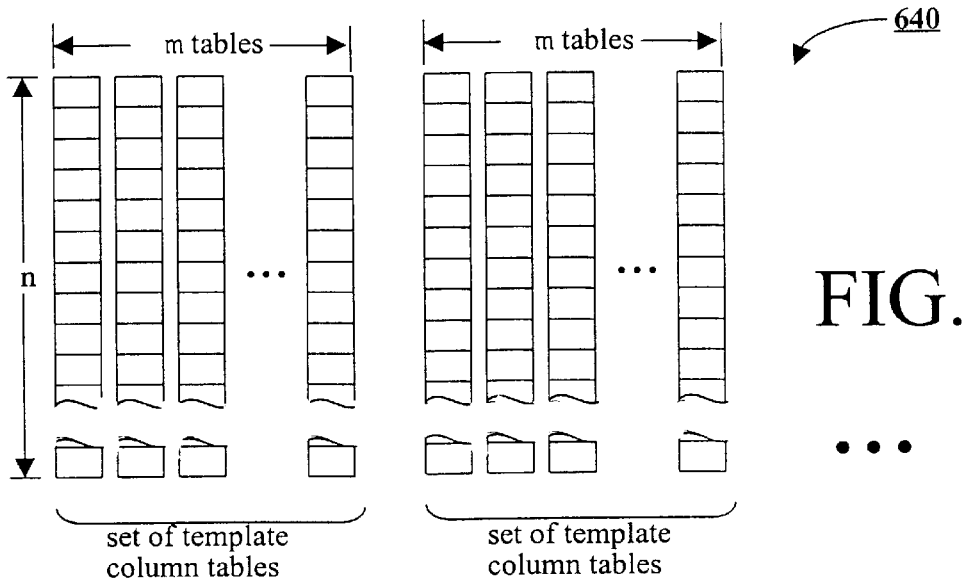

FIG. 14

```
* Compute heuristic score for each entry in 1 x w image column
*   array IC using sets of template score tables;
*w = number of entries in image column array (representing number
*   of pixel columns in row y)
*k = total number of sets of template score tables, 1 set per template
*m = number of n x 1 tables for each multi-level template
*Initialize k x w  Scores array to zero
For q = {1, ... k} do begin
    For i = {1, ... w} do begin
        For j = {1, ... m} do begin
            Scores(q,i) = Scores(q,i) + Template-score-table_q(IC(i + (j -1)))
        End
    End
End
```

FIG. 16

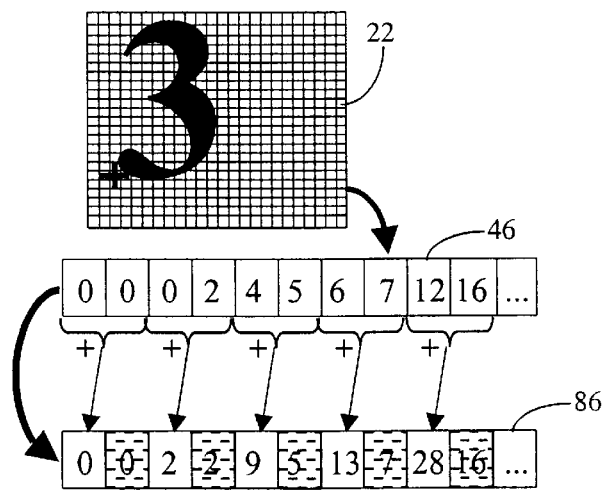

FIG. 17

```
* Compute 1D template column sum arrays from
* 1D template column pixel count arrays
* reuse data structure
*k = total templates; *m= total array entries
For i = {1, ... k} do begin
    For j = {1, 3, 5, ... m-1} do begin
        Template-column-array_{(i,j)} = Template-column-array_{(i,j)}
            + Template-column-array_{(i,j+1)}
    End
End
```

FIG. 18

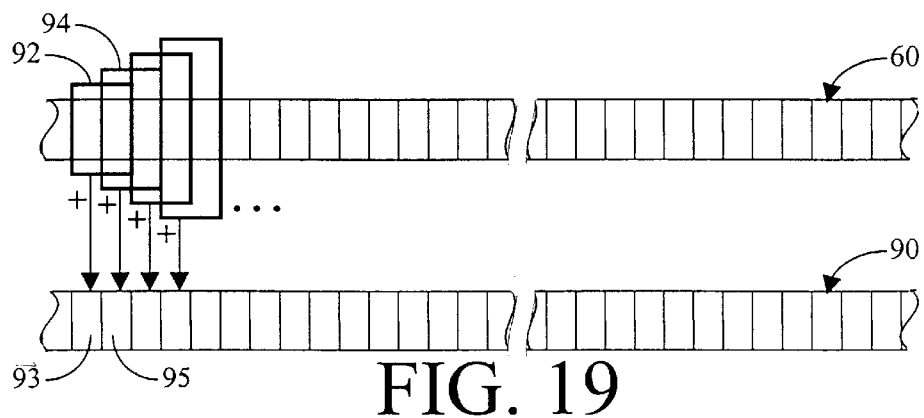

FIG. 19

```
*Compute image sum array (IS) for each image column
* array (IC)
*w = number of entries in both the IC and IS arrays
* Initialize IS array to zero
For i = {1, ... w-1} do begin
    IS_{(i)} = IC_i + IC_{i+1}
End
```

FIG. 20

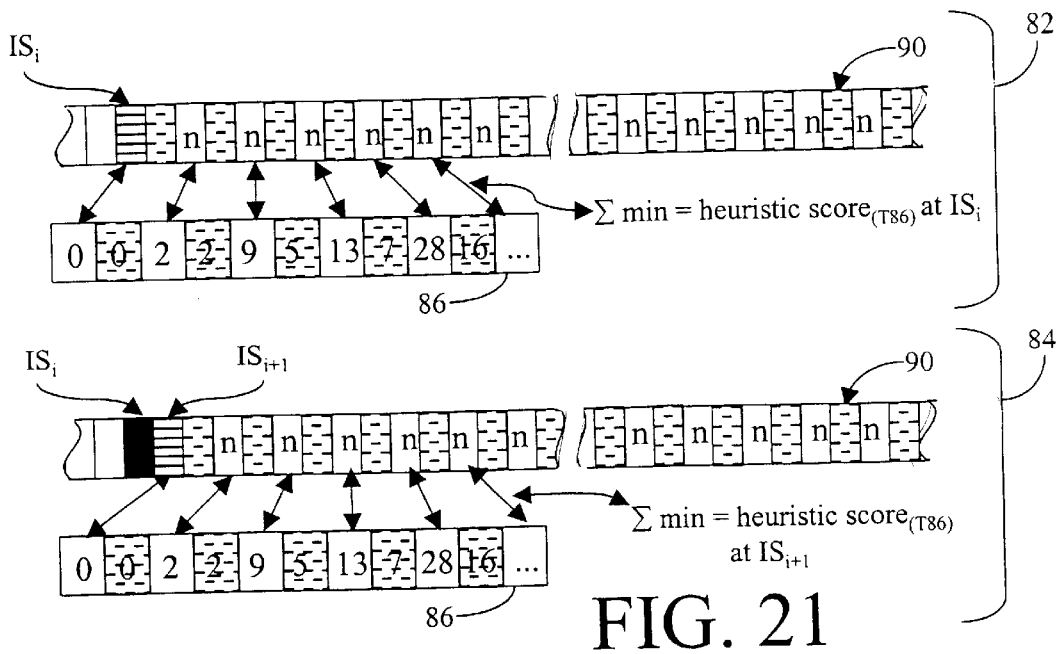

FIG. 21

```
* Compute heuristic score for each entry in 1 x w image sum IS array    410
* using modified template column sum arrays;
*w = number of entries in IS
*k = total number of template column sum arrays
*m = number of entries in each template column sum array
*Initialize 1 x w Scores array to zero
For q = {1, ... k} do begin
    For i = {1, ... w–2} do begin
        For j = {1, 3, 5, ... m–1} do begin
            Score(q,i) = Score(q,i) + min (Template-column-array(q,j) , IS(i+(j-1)))
        End
    End
End
```

FIG. 22

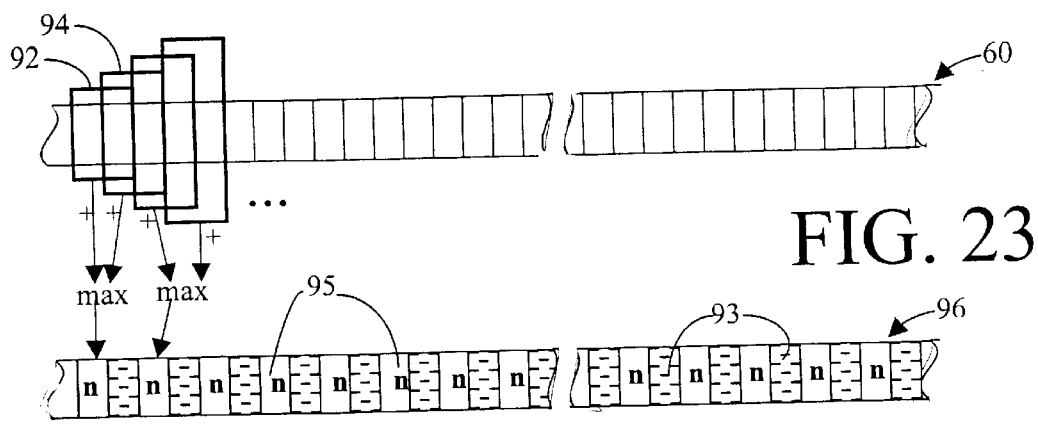
FIG. 23
*Compute image sum max array (ISM) for each image
* column array (IC)
*w = number of entries in both the IC and ISM arrays
* Initialize ISM array to zero
For $i = \{0, 2, 4, ..., w-2\}$ do begin
    $ISM_i = \max(IC_i + IC_{i+1}, IC_{i+1} + IC_{i+2})$
End
FIG. 24
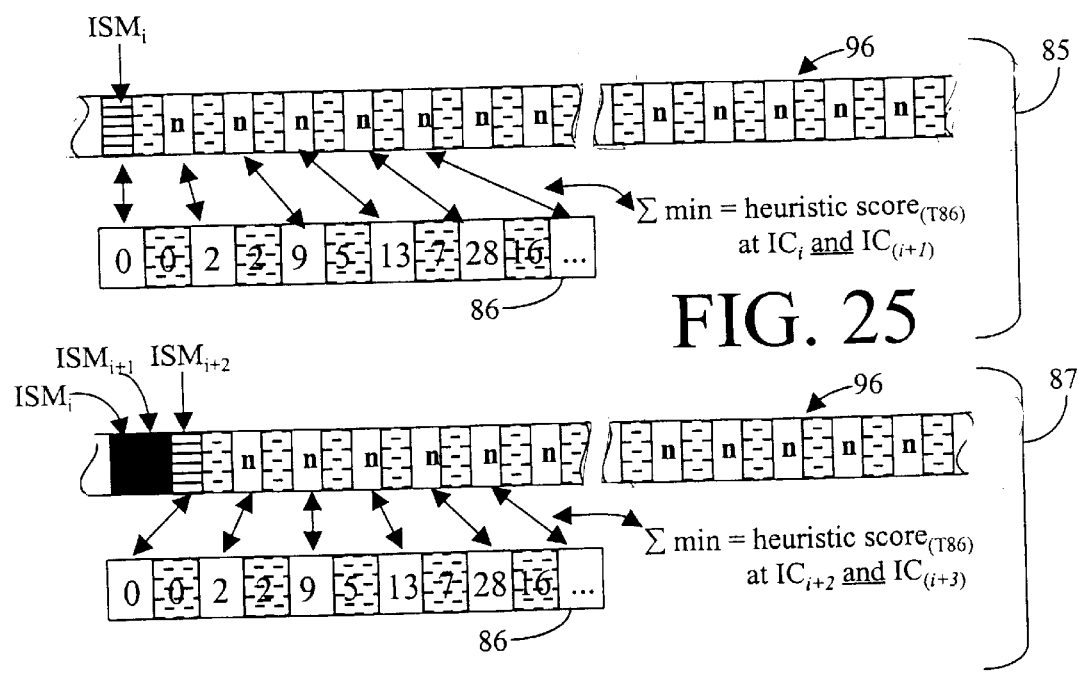
FIG. 25

```
* Compute heuristic score for every other entry in image sum max    440
* array (ISM) using template column sum arrays;
*w = number of entries in ISM
*k = total number of template column sum arrays
*m = number of entries in each template column sum array
*Initialize 1 x w Scores array to zero
For q = {1, ... k} do begin
    For i = {1, 3, 5, ..., w-2} do begin
        For j = {1, 3, 5, ..., m-1} do begin
            Score_(q,i) = Score_(q,i) + min (Template-column-array_(q,j), ISM_(i+(j-1)))
        Score_(q,i+1) = Score_(q,i)
        End
    End
End
```

FIG. 26

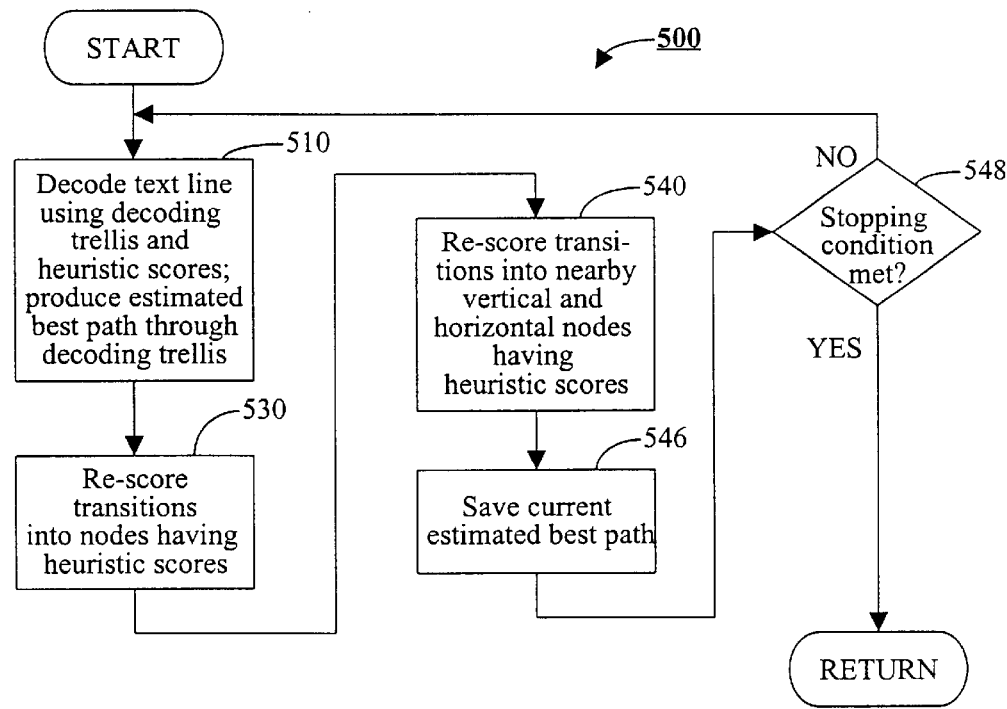

FIG. 27

DOCUMENT IMAGE DECODING USING TEXT LINE COLUMN-BASED HEURISTIC SCORING

CROSS-REFERENCES TO OTHER APPLICATIONS

The subject matter disclosed in this application is related to subject matter disclosed in concurrently filed, commonly-assigned U.S. patent application Ser. No. 09/569,531 entitled "Dynamic Programming Operation with Skip Mode for Text Line Image Decoding" and Ser. No. 09/570,730 entitled "Document Image Decoding Using An Integrated Stochastic Language Model." These disclosures are incorporated by reference herein for all that each teaches as if set out in full. The subject matter disclosed in this application is also related to subject matter disclosed in U.S. Pat. No. 5,321,773, entitled "Image Recognition Method Using Finite State Networks", and in U.S. Pat. No. 5,526,444, entitled "Document Image Decoding Using Modified Branch-And-Bound Methods." Both of the disclosures of these patents are incorporated by reference herein for all that each teaches as if set out in full.

BACKGROUND OF THE INVENTION

The present invention relates generally to image decoding and image recognition techniques, and specifically to image decoding and recognition techniques using stochastic finite state networks such as Markov sources. In particular, the present invention provides a technique for producing heuristic scores for use by a dynamic programming operation in the decoding of text line images.

Automatic speech recognition systems based on stochastic grammar frameworks such as finite state Markov models are known. Examples are described in U.S. Pat. No. 5,199,077 entitled "Wordspotting For Voice Editing And Indexing", and in reference [2], both of which use hidden Markov models (HMMs). Bracketed numerals identify referenced publications listed in the Appendix of Referenced Documents.

Stochastic grammars have also been applied to document image recognition problems and to text recognition in particular. See, for example, the work of Bose and Kuo, identified in reference [1], and the work of Chen and Wilcox in reference [2] which both use hidden Markov models (HMMs) for word or text line recognition. See also U.S. Pat. No. 5,020,112, issued to P. A. Chou and entitled "Image Recognition Using Two-Dimensional Stochastic Grammars."

U.S. Pat. No. 5,321,773, issued to Kopec and Chou, discloses a document recognition technique known as Document Image Decoding (hereafter, DID) that is based on classical communication theory. This work is further discussed in references [2], [4] and [5]. The DID model 800, illustrated in FIG. 28, includes a stochastic message source 810, an imager 811, a channel 812 and a decoder 813. The stochastic message source 810 selects a finite string M from a set of candidate strings according to a prior probability distribution. The imager 811 converts the message into an ideal binary image Q. The channel model 812 maps the ideal image into an observed image Z by introducing distortions due to printing and scanning, such as skew, blur and additive noise. Finally, the decoder 813 receives observed image Z and produces an estimate $\hat{M}$ of the original message according to a maximum a posteriori (MAP) decision criterion. Note that in the context of DID, the estimate $\hat{M}$ of the original message is often referred to as the transcription of observed image Z.

The structure of the message source and imager is captured formally by combining their functions into a single composite image source 815, as shown by the dotted lines in FIG. 28. Image source 815 models image generation using a Markov source. A Markov source is a stochastic finite-state automaton that describes the entire two-dimensional (2D) spatial layout and image components that occur in a particular class of document images as a regular grammar, representing these spatial layout and image components as a finite state network. Prior attempts with stochastic grammar representations of text images confined their representations to single words or single lines of text, without regard to where these words or lines were located on the 2D page. A general Markov source model 820 is depicted in FIG. 29 and comprises a finite state network made up of a set of nodes and a set of directed transitions into each node. There are two distinguished nodes 822 and 824 that indicate initial and final states, respectively. A directed transition t between any two predecessor ($L_t$) and successor ($R_t$) states in the network of FIG. 29 has associated with it a 4-tuple of attributes 826 comprising a character template, Q, a label or message string, m, a transitional probability, α, and a two-dimensional integer vector displacement, Δ.

For example, Markov source model 830 illustrated in FIG. 30 is a simple source model for the class of 2D document images that show a single column of English text in 12 pt. Adobe Times Roman font. In this model, documents consist of a vertical sequence of horizontal text lines, alternating with white (background) space. A horizontal text line is a sequence of typeset upper- and lower-case symbols (i.e., letter characters, numbers and special characters in 12 pt. Adobe Times Roman font) that are included in the alphabet used by the English language. The image coordinate system used with the class of images defined by model 830 is one where horizontal movement, represented by x, increases to the right, vertical movement, represented by y, increases downward, the upper left corner of the image is at x=y=0, and the lower right corner of the image is at x=W, y=H, where W and H respectively indicate the width and height of the image in pixels.

As illustrated in FIG. 28, a Markov source model serves as an input to an image synthesizer in the DID framework. For an ordered sequence of characters in an input message string in the English language and using model 830 of FIG. 30, the image synthesizer generates a page image of a single-text column by placing templates in positions in the page image that are specified by model 830. The operation of text column source model 830 as an image synthesizer may be explained in terms of an imager automaton that moves over the image plane under control of the source model. The movement of the automaton constitutes its path, and, in the case of model 830, follows the assumptions indicated above for the conventional reading order for a single column of text in the English language. From start state node $n_I$ at the top left corner of the image, the imager automaton enters and self-transitions through iterations of node $n_1$ vertically downward, creating vertical white space. At some point the imager reaches the top of a text line and enters state $n_2$ which represents the creation of a horizontal text line. The displacement (0,34) of the transition into $n_2$ moves the imager down to the text baseline; 34 is the font height above the baseline. The self-transitions at node $n_2$, indicated by the loop at $n_2$ and symbols 831 and 832, represent the individual characters of the font and horizontal white space such as occurs with spaces between words. The imager transitions horizontally from left to right along the text line through iterations of node $n_2$ until there are no more characters to be printed on the line (which may be indicated in a variety of ways not specifically shown in model 830.) At the end of the text line, the imager drops down vertically by the font depth distance 13 and transitions to node $n_3$. At node $n_3$ one of two things can happen. If there are remaining text lines, the imager enters "carriage return" state $n_4$ to return to the left margin of the page and back to $n_1$. Or, if there are no more characters or the imager has reached the bottom right corner of the page, the imager transitions from $n_3$ to the final node $n_F$. Node $n_2$ may be considered the "printing" state, where text lines are produced. Additional description of how an image synthesizer functions in the DID framework with model 830 may be found in U.S. Pat. No. 5,526,444 at cols. 5–7 and the description accompanying FIGS. 15–18 therein, and in U.S. Pat. No. 5,689,620, at col. 36–40 and the description accompanying FIG. 14 at col. 39–40 therein.

The attributes on the transitions in Model 830 of FIG. 30 have been simplified in this illustration. Each directed transition into $n_2$, for example, has the associated 4-tuple of attributes shown in FIG. 29: a transition probability, a message string identifying a symbol or character in the English language, a corresponding character template in the font to be used in the page image, and a vector displacement, shown as $(w_t, 0)$ in FIG. 30 that indicates the (x,y) position in the image that the path takes next. For node $n_2$, displacement $(w_t, 0)$ indicates a horizontal distance w that is the set width of the template. The set width of a template specifies the horizontal (x-direction) distance on the text line that the template associated with this transition occupies in the image.

U.S. Pat. No. 5,689,620 extended the principles of DID and the use of Markov source models to support the automatic supervised training of a set of character templates in the font of a particular collection or class of documents, thereby enabling the decoding of font-specific documents for which templates were not otherwise easily available. The use of a Markov source model to describe the spatial layout of a 2D document page and the arrangement of image components such as lines, words and character symbols on the page provides a great deal of flexibility for describing a wide variety of document layouts. This flexibility combined with automatic training of character templates in a specific font provide a powerful technological advantage in the field of automatic document recognition. DID enables the decoding (recognition) of any type of character symbols in virtually any type and size of font and in any type of 2D spatial layout.

The powerful flexibility offered by the DID system is limited in actual use by the time complexity involved in the decoding process. Decoding involves the search for the path through the finite state network representing the observed image document that is the most likely path that would have produced the observed image. U.S. Pat. No. 5,321,773 discloses that decoding involves finding the best (MAP) path through a three-dimensional (3D) decoding trellis data structure indexed by the nodes of the model and the coordinates of the image plane, starting with the initial state and proceeding to the final state. Decoding is accomplished by a dynamic programming operation, typically implemented by a Viterbi algorithm. A straightforward approach to MAP decoding is to use a two-dimensional form of a segmental Viterbi algorithm to compute a set of recursively-defined likelihood functions at each point of the image plane. The forward phase of the Viterbi procedure involves identifying, for each pixel position in the image, the most likely path for arriving at that position, from among the paths generated by the printing of each character template and by using the most likely paths for arriving at all previously computed positions. In effect, the recursive Viterbi procedure involves iterating over each image position and each transition into every node and computing the likelihood of the best path that terminates at the node and image position after passing through the transition.

With reference to the DID framework of FIG. 28, there is a set of probabilities in the image model that are derived from channel model 812. Decoder 813 looks for the most likely observed image Z that could have come from the ideal image Q, given channel model 812. Observed image Z is represented by a path through image model 815. Transcription $\hat{M}$ is formed from the character labels identifying the templates associated with the branches in the path. Based on channel model 812, there is a certain probability distribution over a corrupted image. The probability distribution predicts certain images with certain probabilities. Decoding observed image Z involves computing a set of recursively-defined likelihood functions at each point of the image plane. The likelihood functions indicate the probability distribution evaluated on the specific set of data that is the observed image Z. Each individual node computation computes the probability that the template of a transition corresponds to a region of the image to be decoded in the vicinity of the image point. This template-image probability is represented by a template-image matching score that indicates a measurement of the match between a particular template and the image region at the image point. Producing maximum cumulative path scores at each image position using the template-image matching scores is a way of building up the likelihood in a piece by piece fashion. In terms of the decoding trellis that represents the image model, the template-image matching scores labeling the branches in the trellis are the likelihood terms.

The Viterbi procedure is carried out in the forward direction until the end-point of the best path is unambiguously identified. The backward phase of the Viterbi involves backtracing through the nodes identified as part of the best path to trace out the actual best path. The sequence of character templates associated with the transitions between each node from the start to the final node in the source model on the best path are concatenated to form the message, or transcription, of the decoded image. U.S. Pat. No. 5,526,444 discloses a more detailed description of the decoding process at cols. 7–9 and the description accompanying FIGS. 19–22 therein.

The dynamic programming operation used to decode an image involves computing the likelihood that the template of a transition corresponds to a region of the image to be decoded in the vicinity of the image point. This template-image likelihood is represented by a template-image matching score that indicates a measurement of the match between a particular template and the image region at the image point. Thus, the size and complexity of the image as defined by the model (i.e., the number of transitions) and the number of templates to be matched are major factors in computation time. Indeed, the time complexity of decoding using an image source model of the type shown in FIG. 30 and FIG. 31, and using a Viterbi or Viterbi-like algorithm, is $O(\|\beta\| \times H \times W)$, where $\|\beta\|$ is the number of transitions in the source model and H and W are the image height and width, respectively, in pixels.

There are two factors that influence this complexity. The first is finding the baselines of horizontal text lines. Although decoding computation grows only linearly with image size, in absolute terms it can be prohibitive because, in effect, each row of pixels in the image is evaluated (decoded) as the baseline of a possible horizontal text line. For example, a two-dimensional image of a column of black text represented in a single known font printed on an 8.5×11 inch page of white background and scanned at 300 dpi resolution causes line decoding to occur 3300 times (300 dpi×11 inches). Initially, when DID was first developed, decoding of such an image, without decoding efficiencies and improvements, took about 45 minutes to run, which made the system commercially impractical.

A second key bottleneck in the implementation of the dynamic programming decoding procedure is the computation of template-image matching scores. The matching operation between template and image includes aligning a template with a position in the image, performing an AND operation, and summing the resulting ON pixels, producing a score indicating the match between that template and that position of the image. Each template is matched at an image position, a score is produced, and the maximum score of all templates for that position is accumulated in a running sum to produce the score for the entire line. Thus, each template is matched at each position of a horizontal row of pixels in the image during text line decoding. If there are 100 templates and 1500–2000 x-pixel positions in a line, then each template has to be matched at each x position on the line, requiring a minimum of $10^5$ ANDs and sums to produce actual scores for each position on the line. It was found that decoding accuracy could be improved with the use of multi-level templates (described in more detail below in the Detailed Description) which require separate template-image matching for each of several levels. Moreover, when the position of an actual baseline is not known, scoring must be done for several horizontal rows of pixels around an actual baseline before the node that transitions to the actual baseline is identified. Data showed that each template could be matched at as many as five vertical pixel positions. Thus it was estimated that actual template-image matching scoring for each text line in an image required at least $10^6$ image-template ANDs and sums. In early implementations of DID, this computation was found to far outweigh all other parts of the decoding process.

The need to improve decoding efficiency resulted in a new view of the 2D Markov source model that provides the basic description of a page layout. U.S. Pat. No. 5,526,444 (hereafter, the '444 ICP patent) issued to Kopec, Kam and Chou and entitled "Document Image Decoding Using Modified Branch-And-Bound Methods," discloses the use of a class of Markov source models called separable Markov models. When a 2D page layout is defined as a separable Markov source model, it may be factored into a product of 1D models that represent horizontal and vertical structure, respectively. More formally, a separable model is a collection of named Markov sub-sources that is similar to a recursive transition network. The top-level sub-source is a vertical model whose nodes are all tightly constrained to specific horizontal positions in the image. These position constraints restrict entry to the node to certain regions of the image plane. The '444 ICP patent further discloses that decoding with a separable model involves finding the best path through the 2D decoding trellis defined by the nodes of the top-level model, some of which are position-constrained, and the vertical dimension of the image. The computational effect of a position constraint is to restrict the decoding lattice for a node to a subset of the image plane, providing significant computational savings when used with standard Viterbi decoding.

The '444 ICP patent further discloses the use of a recursive Markov source. A recursive source is a collection of named sub-sources each of which is similar to a constrained Markov source except that it may include an additional type of transition. A recursive transition is labeled with a transition probability and the name of one of the Markov sub-sources. The interpretation of a recursive transition is that it represents a copy of the named sub-source. Thus, some of the transitions of the top-level vertical model are labeled with horizontal models. One aspect of each of the horizontal models is that every complete path through the model starts at a fixed horizontal position and ends at a fixed horizontal position, effectively reducing decoding to a one-dimensional search for the best path. A second aspect is that the vertical displacement of every complete path in the model is a constant that is independent of the vertical starting position of the path. Thus, the horizontal models describe areas of the image plane that are text lines, and the top-level vertical model with its nodes that are constrained by position defines which rows of pixels in the 2D image are to be considered as potential text lines. The match score for each branch is computed by running the horizontal model (i.e., performing the Viterbi procedure) along the appropriate row of the image. The overall decoding time for a separable model is dominated by the time required to run the horizontal models.

In conjunction with the use of separable models, the '444 ICP patent also discloses a heuristic algorithm called the Iterated Complete Path (hereafter, ICP) algorithm that fits into the framework of the Viterbi decoding procedure utilized by DID but improves on that procedure by focusing on a way to reduce the time required to decode each of the horizontal models, or lines of text. The ICP algorithm disclosed in the '444 ICP patent is an informed best-first search algorithm that is similar to heuristic search and optimization techniques such as branch-and-bound and A* algorithms. During decoding, ICP causes the running of a horizontal model (i.e., computes the actual template-image matching scores) for only a reduced set of transitions into each node, the reduced number of transitions being substantially smaller than the number of all possible transitions into the node. Additional information about the ICP best-first search algorithm may also be found in reference [6].

ICP reduces the number of times the horizontal models are run by replacing full Viterbi decoding of most of the horizontal rows of pixels with the computation of a simple upper bound on the score for that row. This upper bound score is developed from a heuristic function. ICP includes two types of parameterized heuristic functions. The '444 ICP patent discloses that the parameters of both of these functions may be automatically inferred from the source model. Thus, for each area of the image where the vertical model indicates that a horizontal text line may occur, in place of performing full Viterbi decoding on each pixel row in that area as if each row could be a text baseline, a heuristic score is first developed for each horizontal row instead.

The '444 ICP patent discloses that the first heuristic function produces a heuristic template-image matching score that is based on weighted horizontal pixel projections. In particular, a heuristic score is developed from a sum of "ON" pixels in a region of horizontal pixel rows in the image that constitute a potential text line. The sum is weighted by a constant to produce the heuristic score. The constant is selected from a source model-dependent vector of non-negative constants that sum to one. This vector is developed from the actual templates that occur in the image and is based on the assumption that the horizontal projection profile has the same shape for every character template from a given source model. For example, for a simple text model such as model 830 in FIG. 30, the vector of constants may be computed as a linear combination of the profiles of the individual character templates, weighted by their relative character frequencies. See FIG. 23 in the '444 ICP patent for the pseudo code of the procedure that computes the weighted horizontal pixel projection heuristic.

Decoding using the weighted pixel projection heuristic proceeds as follows. The inputs to the ICP procedure are the top-level Markov source, a procedure that computes actual template-matching scores, and a procedure that computes the weighted pixel projection heuristic scores. The ICP procedure maintains two data arrays, U and A, indexed by a vertical transition number. The elements of U are initialized with the heuristic scores for each vertical transition prior to iterations of decoding. Boolean array A keeps track of whether U contains a heuristic score or an actual score for each transition. Prior to the first iteration, Viterbi decoding of the top-level model is performed using array U containing all heuristic scores, and an estimated best path is returned. Then a loop is executed for as long as heuristic scores remain as scores in the current estimated best path. This loop includes first computing an actual template matching score for every transition in the estimated best path having a heuristic score, replacing the heuristic score in array U and updating array A to show an actual score for that transition. Then Viterbi decoding of the top-level model is performed using the scores in array U which contain both actual and heuristic scores and a current estimated best path is returned. Transitions in the current estimated best path that contain heuristic scores are identified, and the loop continues with computing an actual template matching score for every transition in the estimated best path having a heuristic score. The ICP procedure ends when the current estimated best path contains actual scores for all transitions in the path. Note that in some implementations, the ICP procedure may also conclude when the best path in a current iteration is the same as the best path in a prior iteration. Decoding concludes with producing the message string associated with the transitions in the best path. More details of the ICP procedure may be found in the '444 ICP patent, beginning at col. 16 and the discussion accompanying FIG. 7 therein. The result of using a separable model with ICP is that actual full Viterbi decoding only takes place in regions of the image that are expected to include text lines, i.e., for those vertical transitions in the top-level vertical model that are recursive transitions.

The second heuristic is called the adjacent row heuristic and is an upper bound on the actual score for the two rows of pixels in the image that are immediately above and below the row for which an actual score has been computed. The adjacent row heuristic formalizes the observation that the actual score for a transition normally doesn't change much from one row to the next. Thus, actual score values completed during an ICP pass may be used to infer new upper bounds on adjacent row heuristic values that are tighter than the initial upper bound heuristics. In practice, the adjacent row heuristic can be used at the end of each pass in ICP to update entries for rows in array U that are adjacent to rows having newly-computed actual score values. A coefficient is computed using parameters in the source model and the coefficient is used to produce new heuristic scores for rows above and below a row having an actual score computed during this iteration, by multiplying this coefficient by the actual score. See the '444 ICP patent beginning at col. 23 for an illustration of how both heuristics work in the decoding of a single line of text. In the example shown, a document image having a height of 10 rows would require 10 iterations of full Viterbi decoding of the text line without the use of ICP and only three iterations of full Viterbi decoding of the text line using both ICP heuristics.

In the '444 ICP patent, the use of a finite state model defined as a constrained and recursive Markov source combined with the ICP algorithm allow for particular transitions to be abandoned as not likely to contain the best path, thereby reducing computation time. Full decoding using the longer computation process of computing the template-image matching scores for a full horizontal line is carried out only over a much smaller number of possible transitions. The '444 ICP patent discloses that the replacement of many long transition score computations with shorter heuristic score computations is responsible for a remarkable decrease in overall computation time reported to be a decrease by factor of 11 in one example and a decrease of a factor of 19 in another example. In an example of the decoding of a single text line image of image height H=10, illustrated in the '444 ICP patent, it was shown that the ICP procedure implemented with both heuristics reduced the number of full-line Viterbi decoding iterations from 10 lines to 3 lines. This means that actual template-image matching scoring needed to be performed for only three of the possible 10 horizontal lines in the image.

While the invention disclosed in the '444 ICP patent provided a significant improvement in overall decoding time over full Viterbi decoding, document recognition of a single page of single-column text using the DID method still required a commercially impractical amount of time. Experiments reported in the '444 ICP patent (see Table 2), for example, showed a decoding time of over two minutes for a full page, single column of text. This time is largely taken up by performing full Viterbi decoding on the individual horizontal text lines, when actual scores are computed to replace the heuristic scores. The improvements provided by the technical advances disclosed in the '444 ICP patent, while significant, did not address the efficient decoding of an individual text line. Additional reductions in the decoding time of individual text lines are desirable.

SUMMARY OF THE INVENTION

Investigation into the reasons for decoding inefficiencies using the improved decoding techniques of the '444 ICP patent showed that replacing the heuristic scores with actual template-image matching scores during decoding of individual text lines, as required by the ICP method, was a central factor in the computation time required to decode a page of text. A full page (8½×11 inch) text document image scanned at 300 dpi (spots per inch) results in 3300 horizontal rows of pixels. Even if the ICP method reduced decoding of horizontal lines by a factor of two-thirds as suggested by the reported illustration, that would still result in over 1000 horizontal lines of decoding, requiring upwards of $10^6$ actual scores per line. Thus, it was hypothesized that the DID method of document recognition could be improved if there were one or more ways to achieve a reduction in the computation time needed to perform full Viterbi decoding of each text line. Because scoring measures the degree of a match between a character template and the observed image, however, it was also imperative that a method for achieving such a reduction in computation time still preserve the remarkable accuracy of the DID method of document recognition.

The technique of the present invention is based on the observation that a heuristic score that was both simpler to compute than an actual score, at best as large as the actual score, and sufficiently accurate to represent an actual score in decoding computations could be used to eliminate the need to compute actual template-image matching scores during full Viterbi decoding of a text line. The present invention identifies such a scoring heuristic based on information about corresponding columns of pixels in both the templates and the image region of the text line being decoded. There are two significant advantages to the scoring heuristic of the present invention. Heuristic column-based scoring produces a true upper bound score for intra-line nodes in the stochastic finite state network that represents the document image model, and so the heuristic scores may be used during line decoding to reduce the number of actual template image matching scores that need to be computed, without sacrificing any accuracy in line decoding.

In addition, using the heuristic scores essentially reduces the two-dimensional computation of the actual template-image scores to a simpler one-dimensional computation for the heuristic scores. The simpler but accurate computation of the column-based heuristic scores provide a significant improvement in computational efficiency because they replace a very large number of computationally expensive actual template image scores required by prior decoding methods. Computing an actual score involves performing an AND operation between a 2D character template and a 2D observed image region and then summing the resulting ON pixels. A column-based heuristic score is computed using one-dimensional data structures that represent information about the counts of ON pixels in columns of the character templates and in columns of the image. These one-dimensional data structures are referred to herein as analogues, or surrogates, of the templates and image. Tests of DID on a full page document using heuristic column-based scoring in place of actual scoring during line decoding show decoding times of thirty (30) seconds or less, as compared to two minute decoding time using the ICP method disclosed in the '444 ICP patent.

The heuristic scoring technique of the present invention may be used in any text line decoder that uses as input a stochastic finite state network that models the document image layout of the document image being decoded. Thus, it may be used in simple text line decoders as well as in the two-dimensional DID method of image recognition disclosed in the patents cited above.

Several embodiments of the heuristic scores are illustrated. In a first embodiment, a template analogue data structure for each character template is produced in the form of a one-dimensional array of the pixel counts of ON pixels in character template columns. An image analogue data structure in the form of a one-dimensional array of the pixel counts of ON pixels in observed image columns is also produced. A column-based heuristic template-image score is computed by comparing a template analogue data structure with the image analogue data structure, and then computing a sum of the minimum of the two numbers for the width of the template. A second embodiment implements column-based heuristic scoring for document image decoding systems using multi-level templates. In this embodiment, the template analogue data structure created for each template essentially functions as a lookup table for a heuristic score for a column count of ON pixels in the image, and the heuristic score is computed for an entire template by summing the individual column scores retrieved from each of the lookup tables. In still another embodiment, the upper bound heuristic score is less rigorously specified and the amount of computation required to produce the score is further reduced. This is achieved by forming the template and image analogue data structures from combined counts of ON pixels in adjacent column in the image and in the templates, and computing the heuristic scores using those analogue data structures. In effect, some pixel counts for columns are interpolated from counts in adjacent columns.

Therefore, in accordance with one aspect of the present invention, a method is provided for operating a processor-controlled machine to decode a text line image. The machine includes a processor and a memory device for storing data including instruction data the processor executes to operate the machine. The processor is connected to the memory device for accessing and executing the instruction data stored therein. The method comprises receiving an input text line image indicating a bitmapped image region including a plurality of image glyphs each indicating a character symbol. The method further comprises obtaining a plurality of character templates and character labels stored in the memory device of the machine. Each character template indicates a two-dimensional bitmapped image of a character symbol, and a character label identifying the character symbol represented by the character template.

The method further comprises producing a one-dimensional (1D) image analogue data structure using pixel counts of image foreground pixels in columns of the image portion of the input text line image, and producing a plurality of 1D template analogue data structures using pixel counts of template foreground pixels in columns of the character templates. Then a plurality of template-image heuristic scores are computed using the 1D image analogue data structure and the plurality of 1D template analogue data structures. Each template-image heuristic score indicates an estimated measurement of a match between one of the plurality of character templates and a two-dimensional region of the image portion of the input text line image. Then, the method performs a dynamic programming operation using a decoding trellis data structure. The decoding trellis data structure indicates a stochastic finite state network including nodes and transitions between nodes indicating a model of expected spatial arrangements of character symbols in the input text line image. The dynamic programming operation uses the plurality of template-image heuristic scores to decode the input text line image and produce the character labels of the character symbols represented by the image glyphs included therein.

In another aspect of the invention for decoding a text line image, producing the plurality of 1D template analogue data structures includes producing a 1D template pixel sums data structure for each character template. Each 1D template pixel sums data structure indicates counts of template column foreground pixels in groups of at least two consecutive columns of the character template. Also in this aspect of the invention, producing the 1D image analogue data structure includes producing a 1D image pixel sums data structure including counts of image column foreground pixels in at least every two adjacent column of pixels in the image portion such that the 1D image pixel sums data structure includes a combined image column count for every column of pixels in the image portion. In this aspect of the invention, computing a template-image heuristic score includes the steps of determining, for each combined template column count in the 1D template pixel sums data structure, a minimum of the combined template column count of the template column foreground pixels and the combined image column count of the image column foreground pixels, and summing the minima to produce the template-image heuristic score, such that one template-image heuristic score is computed for each 1D template pixel sums data structure at each column position in the image portion.

In another aspect of the invention for decoding a text line image, producing the 1D image analogue data structure includes computing a plurality of combined image column counts of image column foreground pixels to produce a 1D image pixel sums data structure. Computing each combined image column count includes the steps of producing a count of foreground pixels in at least every two adjacent column of the image portion, determining a maximum count of foreground pixels for each pair of consecutive counts of foreground pixels, and storing the maximum count of foreground pixels as a combined image column count in the 1D image pixel sums data structure, such that the 1D image pixel sums data structure includes a combined image column count for every other one of the columns of the image portion. Computing a template-image heuristic score includes first computing a first template-image heuristic score using the 1D template pixel sums data structure indicating a first character template at a first column position in the image portion. This computing step includes determining, for each combined template column count in the 1D template pixel sums data structure, a minimum of the combined template column count of the template column foreground pixels and the combined image column count of the image column foreground pixels, and summing the minima to produce the template-image heuristic score. Then the first template-image heuristic score is assigned as the template-image heuristic score for the first character template at a next adjacent column position in the image portion such that one template-image heuristic score is computed for each 1D template pixel sums data structure at every other column position in the image portion.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

BRIEF DESCRIPTION OF THE DRAWINGS

FIG. 11 shows the pseudo code for computing column based heuristic scores according to a first embodiment of the present invention, as schematically illustrated in FIG. 10;

FIG. 12 is a schematic illustration of a multi-level character template of the type used in a second embodiment of the present invention;

FIG. 13 shows the pseudo code for producing a heuristic score for a column of template pixels of a multi-level template of the type illustrated in FIG. 12;

FIG. 14 is a schematic illustration of the column-based heuristic template score tables produced for each multi-level template of the type shown in FIG. 12, according to the second embodiment of the present invention;

FIG. 16 shows the pseudo code for computing column based heuristic scores according to the second embodiment of the present invention, using the heuristic template score tables of FIG. 14;

FIG. 17 is a schematic illustration showing how a variation of the template pixel count array of FIG. 6 is produced, where multiple columns of template pixel counts are summed, according to a third embodiment of the present invention;

FIG. 18 shows the pseudo code for computing the template pixel count sums array of FIG. 17;

FIG. 19 is a schematic illustration showing how a variation of the image column pixel count array of FIG. 7 is produced, where multiple columns of image pixel counts are summed, according to the third embodiment of the present invention;

FIG. 20 shows the pseudo code for computing the image column pixel count sums array of FIG. 19;

FIG. 21 is a schematic illustration of a third embodiment of the column based heuristic scoring technique using the image pixel count sums array produced by the operation illustrated in FIG. 20 and the template pixel count sums array produced by the operation illustrated in FIG. 18;

FIG. 22 shows the pseudo code for computing the column based heuristic scores schematically illustrated in FIG. 21;

FIG. 23 is a schematic illustration showing how a variation of the image column pixel count array of FIG. 7 is produced, where multiple columns of image pixel counts are summed and the max of these sums are stored, according to a fourth embodiment of the present invention;

FIG. 24 shows the pseudo code for computing the image sum max array schematically illustrated in FIG. 23;

FIG. 25 is a schematic illustration of the fourth embodiment of the column based heuristic scoring technique using the image sum max array produced by the operation illustrated in FIG. 24 and the template pixel count sums array produced by the operation illustrated in FIG. 18;

FIG. 26 shows the pseudo code for computing the column based heuristic scores schematically illustrated in FIG. 25;

FIG. 27 is a flowchart illustrating modifications to the image text line decoding procedure when column-based heuristic scoring is used, according to an illustrated embodiment of the present invention;

DETAILED DESCRIPTION OF THE INVENTION

1. Producing Actual Template-image Matching Scores

Figure 30:
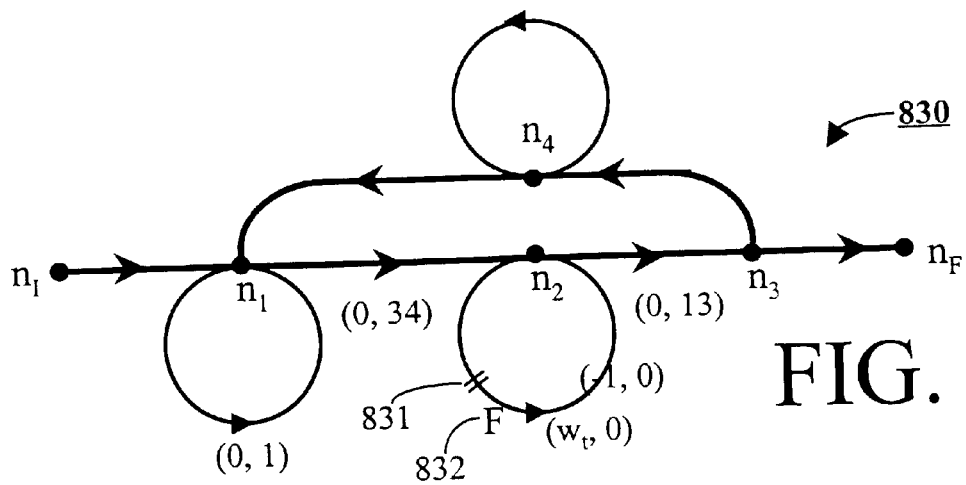
FIG. 30 is a schematic illustration of a simplified Markov source modeling a class of two-dimensional document images that contain a single, multiple text line column of English text.
Figure 31:
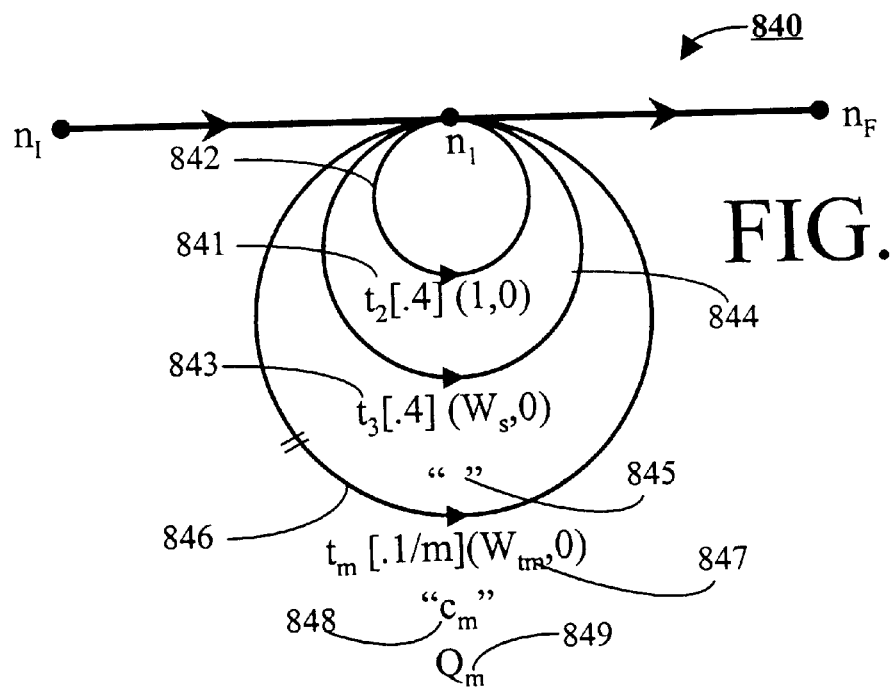
FIG. 31 is a schematic illustration of a simplified Markov source modeling a class of one-dimensional document images that each contains a single line of English text.

The technique of the present invention is best understood when described in the context of how actual template-image matching scoring is performed in previous implementations of image decoding using a stochastic finite-state network such as the Markov source 830 of FIG. 30 or Markov source 840 of FIG. 31. A brief review of actual template-image matching scoring is described with reference to the representative simple image 10 of FIG. 1. For purposes of this description, image 10 is assumed to be an image in the class of documents described by Markov source 830 of FIG. 30, having dimensions W×H with an origin at the upper left corner where y×x×0 in an x,y coordinate system. Image 10 has been scanned at 300 dpi and includes just a single line 12 of random English language glyphs printed in 12 point Times New Roman font. The term glyph as used herein is a single instance, or example, of a character that is realized in an image. As noted above in the Background discussion of DID, decoding image 10 using the DID method and techniques disclosed in U.S. Pat. No. 5,321,773 and the '444 ICP patent involves finding the best path through image 10, which, in this case, passes through line 12. As noted in the '444 ICP patent, decoding thus amounts to finding the best path through the text line once its baseline has been identified. Prior DID implementations indicate that the text baseline is identified by the largest actual template-image matching score among the scores for each of the horizontal pixel rows of a span of horizontal pixel rows around an expected baseline of the text line.

Figure 2:
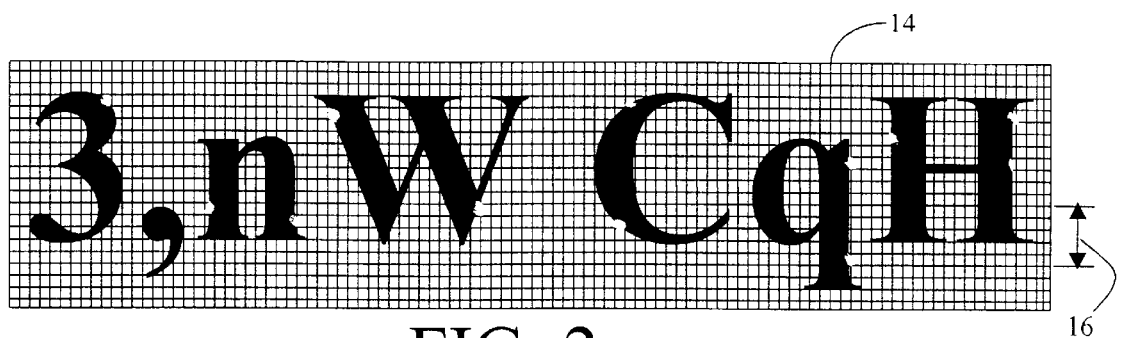
FIG. 2 is a schematic illustration of a portion of the text image of FIG. 1.

Portion 14 of image 10 has been called out and is shown magnified in FIG. 2 to show a representation of the scanned image glyphs in pixels with image noise introduced as a result of the printing or scanning processes. Reference numeral 16 calls out a representative span of five horizontal pixel rows that require actual scoring in order to find the true text baseline. As mentioned above in the Background discussion, actual scoring involves matching character templates with portions of image 10.

Figure 3:
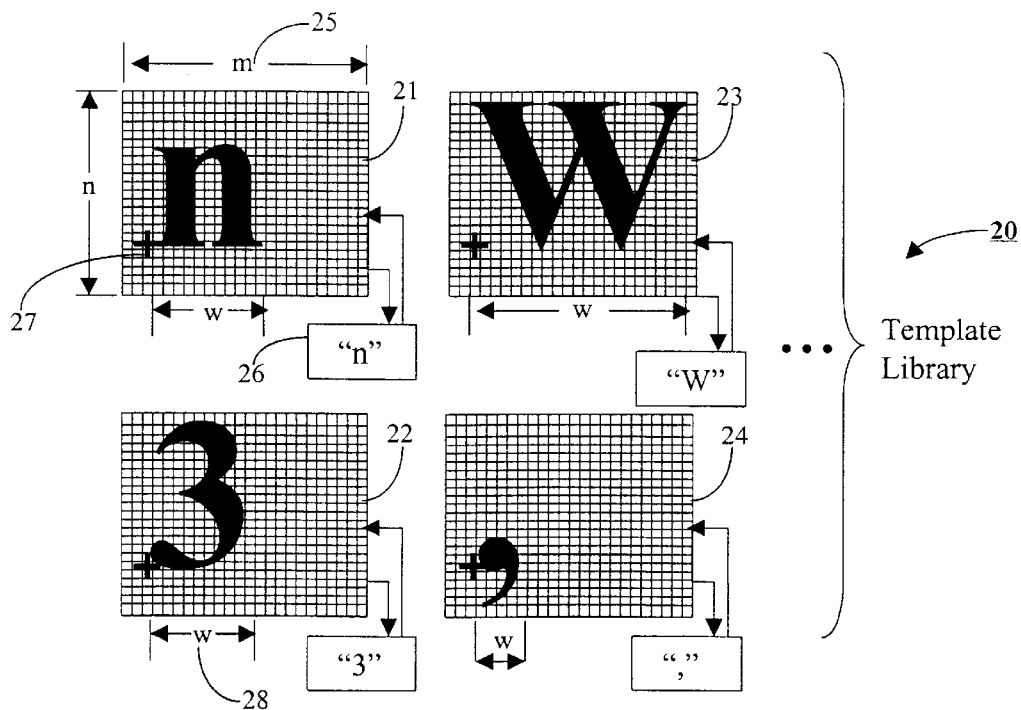
FIG. 3 is a schematic illustration of a library of bi-level character templates of the type used in the technique of the present invention.

FIG. 3 shows a library 20 of character template data structures of the type used by prior DID implementations and a first embodiment of the technique of the present invention. Each template data structure, such as template 21, indicates a bitmapped image of a character and a character label 26 identifying the character. A character label typically uniquely identifies a character in the character set used in the document text, but may also indicate some other information that uniquely identifies the particular template, or may additionally contain font identifying information, size, or type style information. As shown in FIG. 3, each template has dimensions m×n pixels, has an origin point illustrated in template 21 by crossbar 27, and a set width 28 labeled for further reference as set width w. The template origin of the templates in the illustrated template library 20 is designated at the same location within each template. The illustration of character templates in FIG. 3 as 2D arrays of pixels is not intended to limit the type of data structure that may represent a template of the type suitable for use in the present invention. A template may be constructed from the concatenation of pieces of bitmapped characters, such as vertical strokes, joins, ascenders, descenders and curved portions. A template may also be represented by a formal model that produces as its output an explicit 2D array of pixels representing a complete character template. Additional information about character templates may be found in U.S. Pat. No. 5,689,620, entitled "Automatic Training of Character Templates Using a Transcription and a Two-Dimensional Image Source Model". The disclosure about character templates in U.S. Pat. No. 5,689,620 at columns 25–26, lines 12–67 and 1–6, respectively, is hereby incorporated by reference for all that it teaches.

The support or foreground of a bitmapped character template is the set of pixel locations where the template differs from the background. In documents containing black text on white background, the template support is the set of black ("ON") template pixels. Thus, reference is made herein to black foreground pixels and white ("OFF") background pixels for consistency with this convention, but it is understood that character templates may be defined as having foreground pixels in colors other than black, or may be "reverse video" templates indicating white text on a black background. In recent implementations of document recognition using DID methods, the support and background areas of templates are separated into distinct levels and assigned different image occurrence probabilities. A template in which the support and background areas are separated into two distinct levels, one level for the black foreground pixels and one level for the white background pixels, is referred to herein by the term bi-level template, indicating a maximum of two pixel levels. Bi-level templates are distinguishable from a multi-level template that includes two or more levels of black foreground pixels, indicating different probabilities of occurrence for some black foreground pixels. Multi-level templates are described in more detail in Section 3 below.

For purposes of this discussion, the templates in template library 20 may be considered to be either bi-level templates or standard templates in which the background and foreground levels have not been separated. In computing either actual or heuristic scores using template library 20, only the foreground (black) pixels are involved in the computation.

Figure 4:
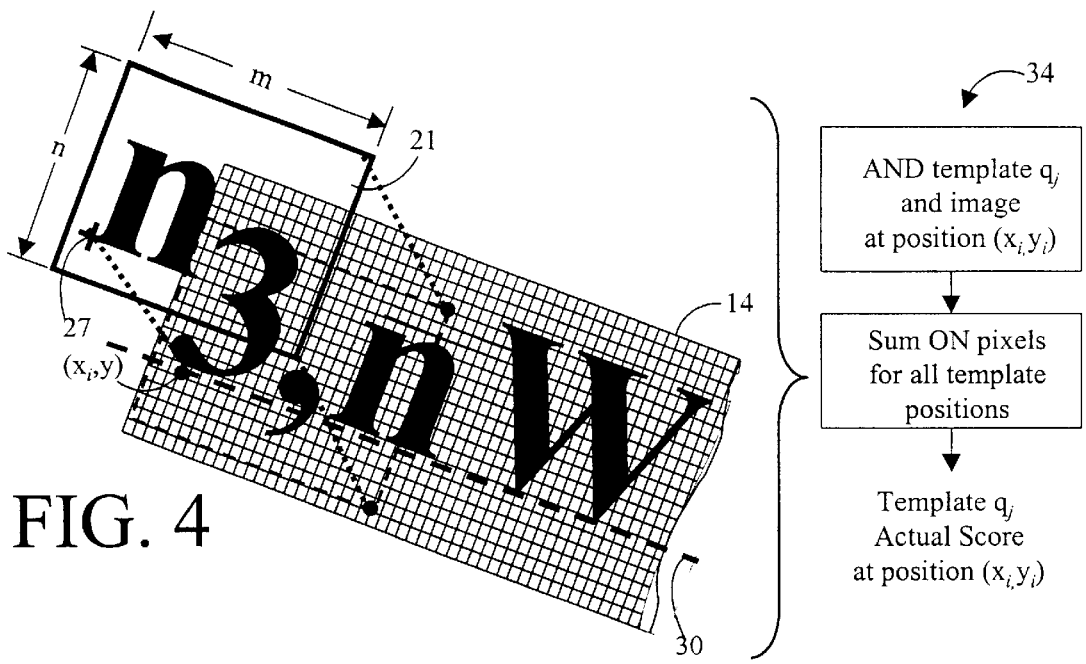
FIG. 4 is a schematic illustration of a template from the template library of FIG. 3 matched with the text image portion of FIG. 2 and showing a flowchart of the steps for computing an actual template-image matching score used in a stochastic finite state image decoder.

As previously described above, the matching operation between template and image includes aligning a template with a position in the image, performing an AND operation, and summing the resulting ON pixels, producing a score indicating the degree of the match between that template and that position of the image. FIG. 4 schematically illustrates the aligning of template 21 at image position $(x_i, y_i)$ of image portion 14 during the process of computing actual template-image matching scores for row $y_i$ which is called out by dotted line 30. The origin 27 of each template is aligned with an image location $(x_i, y_i)$ in image portion 14, creating a region 18 of image portion 14 to be used in creating the template-image matching score. The score is produced according to the steps identified in flowchart 34. A score is produced for each template in template library 20 aligned at image location $(x_i, y)$, and the maximum score of all of these template-image matching scores for image position $(x_i, y)$ is accumulated in a running sum. This process is repeated for the next horizontal position in row y $(x_{i+1}, y)$, the maximum score is accumulated in the running score, until scores have been computed for all horizontal row positions. The resulting accumulated running score is the actual template-image matching score for row y.

2. Column-based Heuristic Scoring for Bi-level Templates

The present invention introduces a technique for computing a new upper bound heuristic template-image matching score based on column pixel counts, and for using this new heuristic during the decoding of text lines in any full page or line decoder that uses a stochastic finite-state network as the image source and a dynamic programming operation such as a Viterbi procedure to perform decoding. The heuristic scoring technique is first described with reference to templates having a single level of support (e.g., black) pixels. Multi-level templates are addressed separately below in Section 3.

Figure 5:
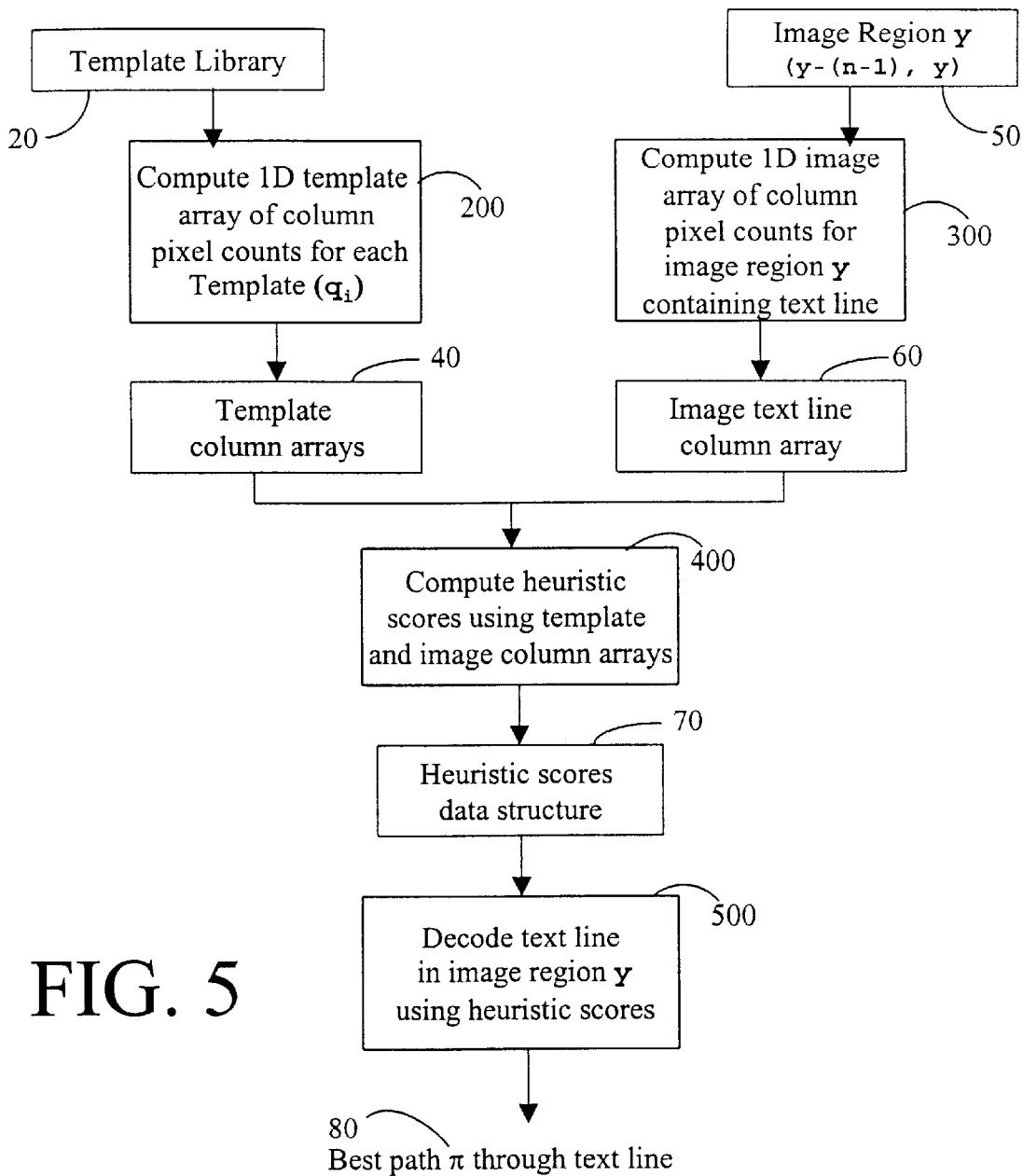
FIG. 5 is a flowchart illustrating the general operation of a decoding operation for decoding an image text line using column-based heuristic scoring according to a first embodiment of the present invention.

FIG. 5 is a block diagram of the major processes of a first embodiment of the column-based heuristic scoring technique showing operations 200, 300 and 400 and illustrating input and output data structures. In general, the present invention includes producing special data structures for the purpose of computing heuristic scores. These special data structures are simpler, one-dimensional surrogates derived from the character template data structures and image text line data structure that allow for efficient computation of upper bound heuristic scores. These surrogate data structures in their most general form may be referred to as template analogue data structures and image analogue data structures. Each of these data structures indicates information about the column pixel counts in their respective source data structures. The remainder of the discussion will present several embodiments of the template and image analogue data structures, referred to by different names.

a. Producing Template Column Arrays

Figure 6:
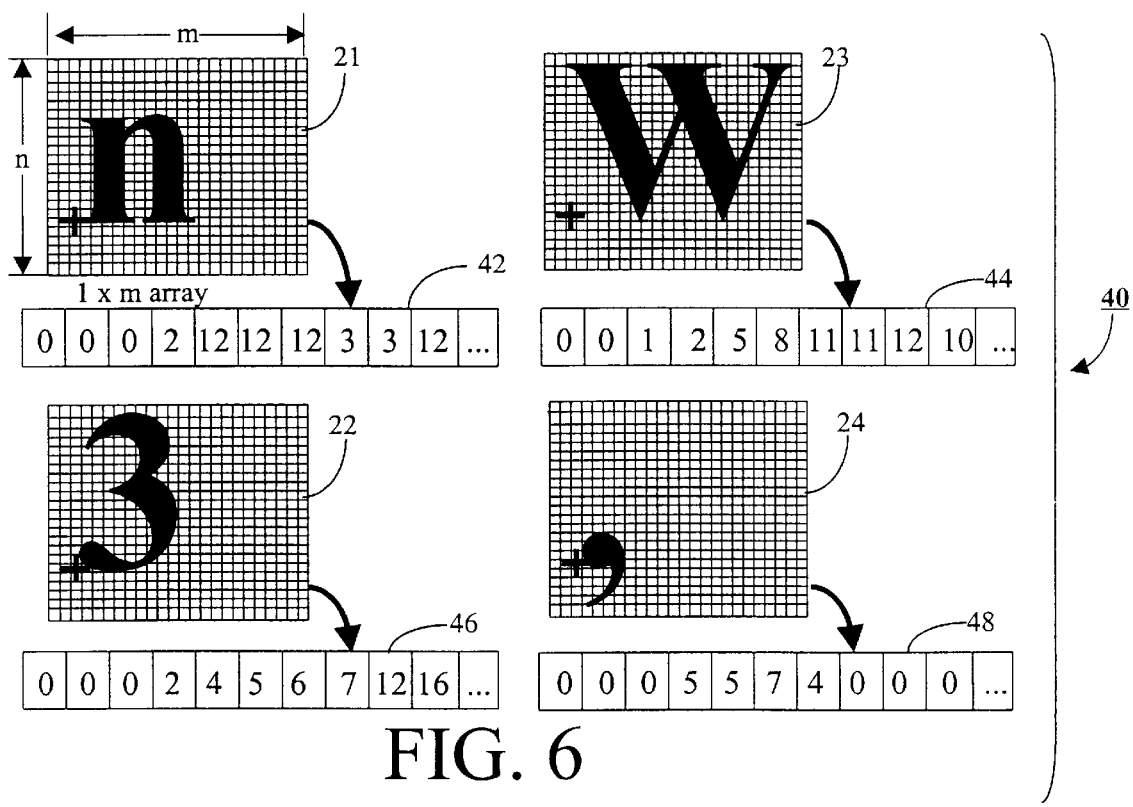
FIG. 6 is a schematic illustration of a set of one-dimensional column-based template pixel count arrays produced for the templates in the template library of FIG. 3, according to the first embodiment of the present invention.
Figures 7, 8:
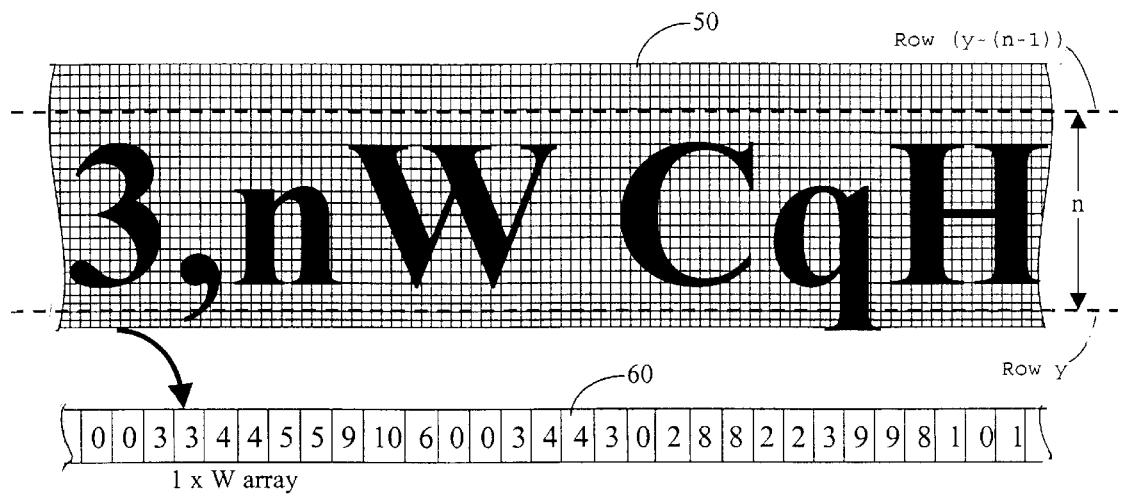
FIG. 7 is a schematic illustration of a one-dimensional column-based image pixel count array produced for a horizontal image region of the image of FIG. 1 according to the first embodiment of the present invention.
FIG. 8 shows the pseudo code for producing template column-based pixel count arrays of the type illustrated in FIG. 6.

FIG. 5 is best understood in conjunction with FIG. 6 through FIG. 11. Operation 200 of FIG. 5 produces a set 40 of one-dimensional (1D) 1×m template column arrays, one array for each template in template library 20 (FIG. 3). Each data item in a template column array corresponds to a column of pixels in a template and indicates the number of ON pixels in that template pixel column. FIG. 6 schematically illustrates the production of template column arrays 40 for templates 21, 22, 23 and 24 of template library 20 of FIG. 3. FIG. 8 shows the pseudo code for the straightforward process that produces template column arrays 40. Template column arrays 40 are typically created prior to decoding when the contents of template library 20 are identified, and so do not directly contribute to the computation associated with decoding individual text lines.

b. Producing an Image Text Line Column Array

Figure 1:
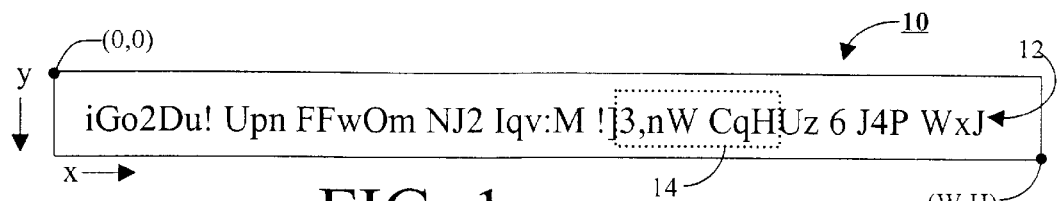
FIG. 1 is a schematic illustration of a single-line text document image for use in illustrating the general operation of the present invention.
Figures 9, 10:
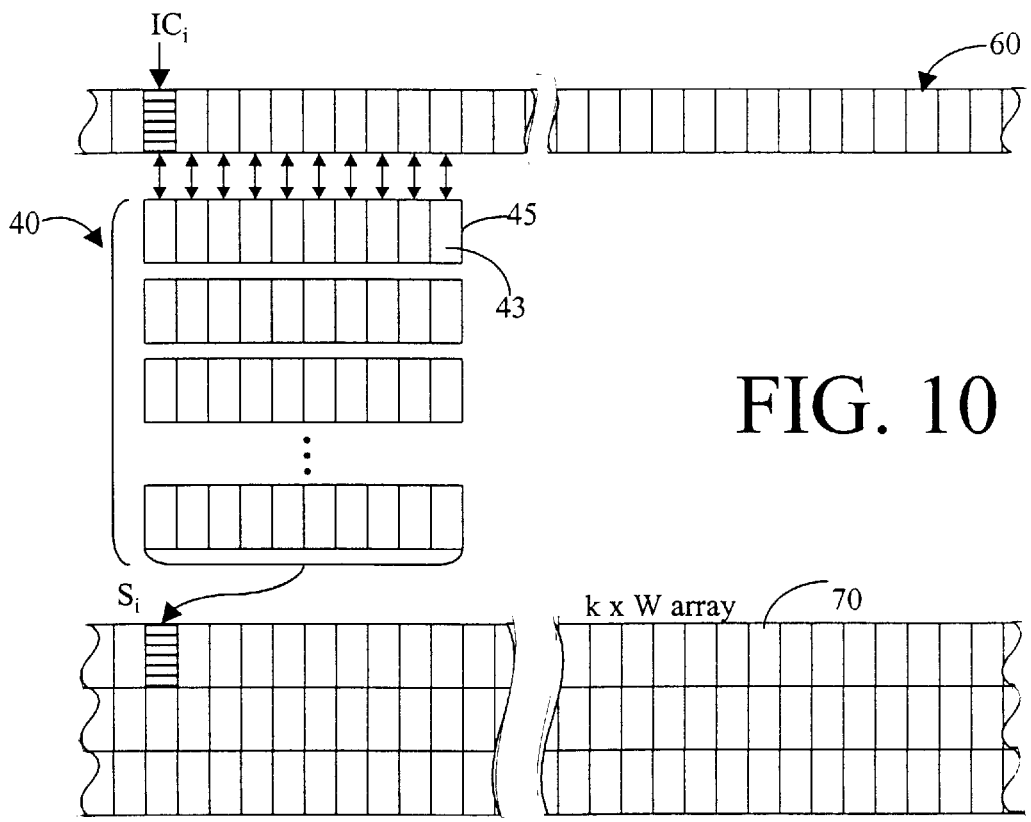
FIG. 9 shows the pseudo code for producing an image region column-based pixel count array of the type illustrated in FIG. 7.
FIG. 10 is a schematic illustration of the column based heuristic scoring technique of a first embodiment of the present invention using the column-based image pixel count array produced by the operation illustrated in FIG. 8 and the image region column-based pixel count array produced by the operation illustrated in FIG. 9.

Operation 300 produces 1×W image text line column array 60 using as input an image region of width W in the image to be decoded. In the language of the DID system, the image to be decoded is referred to as the observed image Z, and image 10 of FIG. 1 is an example of observed image Z having dimensions W×H. FIG. 7 schematically illustrates the production of image text line column array 60 for an image region 50 of image 10. Image text line column array 60 is produced with respect to some row y of horizontal pixels in Z that is believed to be at or near a baseline of text. Each data item in image text line column array 60 corresponds to a column of pixels in an image-wide image region in Z and indicates the number of ON pixels in that pixel column. Image region 50 has dimensions n×W, where n is the height of a template in template library 20. FIG. 9 shows the pseudo code for the process that produces image text line column array 60. While computation of column array 60 is a direct computational cost of decoding, significant improvement in decoding efficiency results from reducing the need to compute all of the actual template-image matching scores. Decoding begins with heuristic scores produced using template column arrays 40 and image column array 60, and actual template-image matching scores are computed only as needed. Also, the heuristic score is valid for any vertical positioning of the template around the image baseline, which is generally not exactly known in advance of decoding and is in fact determined as a result of the decoding.

c. Computing a Heuristic Template-image Column-based Score

Decoding a text line using heuristic column-based scoring consists of executing the Viterbi decoding procedure described in the referenced '444 ICP patent and in U.S. Pat. No. 5,321,773 using heuristic column-based scores in place of actual template-image matching scores in order to identify the best path through the text line. The Viterbi decoder requires a score for each pixel position, $x_i$, of the horizontal text line that indicates the best match of all the templates in the template library with the observed image at pixel position $x_i$. Thus, the column-based heuristic scores are computed prior to the actual decoding of a text line. Operation 400 of FIG. 5 produces the column-based heuristic scores 70 using as input image column array 60 and the set of template column arrays 40. Heuristic scores array 70 is a k×w array, where k is the total number of templates in the source model, and w is the width of the image text line, or portion thereof, being decoded. In this first embodiment of the present invention, a column-based heuristic score is computed for every template at every image position i of the image text line, and all scores are stored for use by the dynamic programming decoding operation.

FIG. 10 schematically illustrates how the heuristic scores 70 are produced. Each array element $IC_i$ in image column array 60 represents a column-based pixel count for pixel position $x_i$ in the text line image. Each template column array 45 in the set 40 of k template column arrays is a 1×m array with each entry 43 representing a column-based pixel count for that column in that template. Operation 400 (FIGS. 5 and 11) produces a total of k×w scores, one for each template at each pixel position in the text line image being decoded. FIG. 10 shows this set of heuristic scores stored in k×W heuristic score array 70. To produce score $S_{k(i)}$ in array 70 indicating the heuristic score for pixel position $x_i$ in the text line image, the entries in each template column array are compared entry by entry to the same number of consecutive entries in image column array 60 beginning at array element $IC_i$. This effectively compares column pixel counts in a template with column pixel counts in the observed image for the width of a character template. FIG. 10 uses lines with double arrows between template column array 45 and the set of array entries in image column array 60 beginning with entry $IC_i$ to represent this comparison. The minimum of each pair of compared entries is taken and added to a running sum indicating the score for that template. The final template score from all sums of the minima becomes the entry $S_{k(i)}$ in score array 70. Each template column array in the set 40 of arrays is compared in like manner with the set of array entries in image column array 60 beginning with entry $IC_i$. FIG. 11 shows the pseudo code for operation 400 as just described.

It can be shown that the column-based heuristic scores are true upper bound scores for the actual template-image matching scores. First, in an actual template-image matching score, it can be seen from the schematic illustration of FIG. 4 that the contribution from each template column is the number of pixels in the column that are ON after the template-image AND operation. The AND operation ensures that this number of ON template column pixels cannot exceed either the number of ON pixels in the template column or the number of ON pixels in the image column being matched. Thus the minimum of the number of ON column pixels in the template and the number of ON column pixels in the image is a true upper bound to the actual matching score between the template and image.

3. Computing Column-based Heuristic Scoring for Multi-level Templates

A second embodiment of column-based heuristic scoring technique of the present invention is applicable to text line decoding in stochastic finite state network recognition systems that use multi-level templates. Document image decoding using multi-level templates gives more accurate transcription results than the bi-level templates that have been the focus of the discussion to this point. Multi-level templates are described in reference [7] and in U.S. Pat. No. 5,706,364, in the discussion accompanying FIGS. 19 and 20 at col. 34–36.

a. Describing Multi-level Templates

FIG. 12 provides a schematic illustration of a multi-level character template 620. A multi-level template categorizes foreground and background pixels into different pixel groupings according to their probability of occurrence in an observed image. Each pixel grouping is a template level. FIG. 12 shows by way of example a five level template as a collection of five stacked rectangles, each rectangle indicating a template level having dimensions m×n and including designated pixels. In template 620, for example, a single column of pixels at the same location in each template level is shown. Template pixel columns 630 and 632 in template levels 621 and 623 respectively are specifically called out. In column 630 of level 621, pixels 642 are identified as the pixels belonging to that level. In column 632 of level 623, pixels 644 are identified as the pixels belonging to that level. Thus, the black and white pixels in each column of a single level template are distributed across the template levels in a multi-level template. A pixel cannot belong to more than one level, and each of the pixels is found at some level, such that each pixel occurs exactly once, in one of the levels.

With continued reference to FIG. 12, template levels may be designated as being one of three types. The first type of template level is one that includes a set of certain ones of the black pixels in the character image that have a greater probability of being a foreground pixel (black) than of being a background pixel. This template level is called a foreground, or black, pixel template, and has a positive weight associated with it when computing an actual template-image matching score. Template levels 621, 622 and 623 are designated as black pixel templates, as indicated by label 631 "b1" in each of the levels. The second type of template level is one that includes a set of certain ones of the white pixels in the character image that have a greater probability of being a white pixel than of being a background pixel. This template level is called a white pixel template, and has a negative weight associated with it. Template 620 of FIG. 12 contains one white pixel template level 624, as indicated by label 633 "wh". A third type of template level is the set of background pixels that form no part of the support of the character image. The background template level does not participate in the template-image matching scoring process. Template level 625 of FIG. 12 is designated as a background pixel template, as indicated by label 634 "bk". In general, a multi-level template includes at least two levels of black foreground pixels and a background, neutral level of pixels.

With continued reference to FIG. 12, a multi-level character template also has a probability associated with each level that indicates the probability of the pixels at that level occurring in a character image in the observed image. Typically black pixels in the center of a stroke have a high probability of occurring while black pixels near the edge of the character have a lower probability. FIG. 12 shows the probabilities 650 as boxes designated by a w with a subscript indicating their level number. The role of probabilities is explained in more detail below.

b. Actual Template-image Matching Scoring Using Multi-level Templates

Each level of a multi-level template is considered to be a separate template for purposes of computing actual template-image matching scores. The background template level is generally not used in computing actual scores. However, there may be a white template level established for the purpose of computing actual scores. Identifying which pixels in a character image are expected to be white in the observed image can provide information about whether that character is being observed in a region of the image. Thus, computing actual scores for an n-level multi-level template requires n−1 matches between each of the black and white template levels and the image, with the neutral (background) level not being used in the computation. Computing actual scores for five level template 620 of FIG. 12 requires four template-image match computations between the template and the image, with background level 625 (designated by label 634 "bk") not being used, plus the appropriate weighting (either positive or negative) of each sum at each template level.

As with actual scoring for bi-level templates, an AND and sum operations are produced for each template-image match, as described in the discussion accompanying FIG. 4 above. Then, each template level's match score is weighted by the probability associated with that template level. For example, a black pixel template containing pixels in the center of a stroke has a probability of close to 1, indicating that these black pixels have a high probability of being ON. The high positive weighting of the probability associated with this black pixel template increases the contribution to the overall actual template-image matching score when these pixels are found to be ON in the image. A black pixel template containing pixels at the boundary (edge) of a character has an assigned probability weighting value intermediate between the high probability black pixel template and the low probability associated with a neutral background pixel template. This intermediate weighting indicates that these black pixels are susceptible to channel noise and their presence or absence in the observed image have a less significant, though positive, contribution to the overall actual template-image matching score when these pixels are found to be ON in the image.

A multi-level template may also include a white pixel template level that is distinguished from the background level. Template 620 of FIG. 12 is an example of such a template, including white template level 624. This white pixel template, sometimes referred to as write-white template level, has a negative weight associated with its probability, such that its use when computing actual template-image matching scores may potentially either reduce a matching score or have no effect on the score. Specifically, a non-match between the white (OFF) pixels designated as included in this template level with ON pixels in the observed image at these locations results in a negative contribution to the overall matching score, while a match between the white pixels in this template level with white (OFF) pixels results in no contribution to the overall actual template-image matching score.

Finally, a constant, normalizing term is added to the overall actual template-image matching score of a multi-level template. The constant is computed once from the number of ON pixels and the template level probabilities in the multi-level template. This constant depends only on the template, and is independent of the image pixels. Since this constant is not relevant to computing column-based heuristic scores for multi-level templates, further reference to it is omitted from the discussion that follows.

c. Producing a Data Structure of Heuristic Scores for Multi-level Templates

Column-based heuristic scoring for bi-level templates as described above need not account for which specific pixels are ON in the image when the score is computed. However, it can be seen from the above description of multi-level templates and actual scoring that the use of the weighting factors is a significant component in computing an actual template-image matching score for such templates. It can be further seen that the weighting factors in actual scoring reflect which specific pixels were matched between the observed image and the individual template levels. The process for computing a heuristic score for a multi-level template, therefore, has been designed to implicitly account for assigning the ON pixels in the observed image to the various levels of the template. Like heuristic scoring using bi-level templates, a heuristic score using a multi-level template is also a column-based score. The scoring process is both computationally efficient and maximizes the heuristic score so that it is a true upper bound score.

With reference again to FIG. 12, it can be seen that template 620 contains a total number of n ON and OFF pixels in a template column, where n is the height of the column in pixels. These n pixels are assigned to, or distributed among, the various template levels. Thus, an identically located column in each level has a maximum number of ON pixels and a maximum number of OFF pixels. The technique of the present invention is based on the premise that ON and OFF pixels in an observed image column can be systematically allocated to various template levels regardless of where in the image column these pixels occur, in a manner that maximizes the heuristic score. Specifically, a column based template-image heuristic score for a given template is maximized when the ON pixels in an observed image column are allocated to the highest probability black template level columns until each of their respective maximum ON pixel counts is reached, then to the neutral background level, and finally to the white template level. Allocating image column pixels to columns in template levels in this manner can be referred to as "filling" the template levels. A heuristic score is increased whenever an ON pixel in an observed image column fills a black pixel assigned to a black template level, and is decreased whenever an ON pixel in an observed image column fills a white pixel assigned to a white template level. This is consistent with what would happen during the computation of the actual template-image matching score.

TABLE 1

| Template level/type/ | Image Column Black Pixel Count | | |
|---|---|---|---|
| #pixels ON-OFF/wgt | 15, . . . 21 | 23 | 11 |
| Level 621/bl 2 ON/$w_{621}$ | Filled | Filled | Filled |
| Level 622/bl 4 ON/$w_{621}$ | Filled | Filled | Filled |
| Level 623/bl 9 ON/$w_{621}$ | Filled | Filled | Filled |
| Level 625/bk 6 OFF/$w_{621}$ | 0 to Filled | Filled | Empty |
| Level 624/wh 4 OFF/$w_{621}$ | Empty | Filled | Empty |

TABLE 1 provides an illustration of sample data used to compute a column-based heuristic score for a match between pixels in a template column and pixels in an image column, using five-level template 620 of FIG. 12 for illustration. TABLE 1 shows the five levels of template 620 arranged in descending order of probability value. Note that white template level 625 precedes white template level 624 in TABLE 1 because the absolute value of the probability of level 625 is higher than that of level 624 and so is "filled" first when doing pixel allocations. Template 620 is assumed to have a pixel height of 25 pixels for purposes of this example. Each template level is assigned a number of ON or OFF pixels. For example, template level 623 contains nine (9) ON pixels. Three examples of image column black pixel count data are shown in TABLE 1. In the first example, there are anywhere from 15 to 21 black pixels in the observed image column. These black pixels completely fill black template levels 621, 622 and 623, for a total of 15 black pixels. Additional black pixels in the observed image column up to 6 will fill background level 625. The heuristic score for this observed image column is computed as follows $$\text{Score}_{(15 \ldots 21)} = 2{*}w_{621} + 4{*}w_{622} + 9{*}w_{623} \quad (1)$$

Note that, just as in computing the actual score, the background level 625 is not used in computing the heuristic score. In essence, black pixels 16 through 21 in the observed image column have no effect on the heuristic score.

In the second observed image example in TABLE 1, there are 23 black pixels in the image column. These black pixels completely fill black template levels 621, 622 and 623, for a total of 15 black pixels. An additional 6 black pixels in the observed image column completely fill background level 625. The remaining 2 black pixels partially fill white tem plate level 624. The heuristic score for this observed image column is computed as follows $$\text{Score}_{(23)}=2*w_{621}+4*w_{622}+9*w_{623}+2*w_{624}, \text{ for } w_{624}<0. \quad (2)$$

In the third observed image example in TABLE 1, there are 11 black pixels in the image column. These black pixels completely fill black template levels 621 and 622, for a total of 6 black pixels. The remaining 5 black pixels partially fill black template level 623. None of the white template levels is filled. The heuristic score for this observed image column is computed as follows $$\text{Score}_{(11)}=2*w_{621}+4*w_{622}+5*w_{623} \quad (3)$$

FIG. 13 shows the pseudo code for computing the column-based heuristic score just described above.

The examples in TABLE 1 suggest that column-based heuristic scores for the match between an observed image column and a column in the multi-level template can be computed and stored in advance for all possible numbers of black pixels in an observed image column. This is in fact what is done for multi-level templates. Computed column-based heuristic scores are stored in a table with the number of black pixels in the observed image column serving as the index into the table. A set of m 1×n tables of scores computed according to the process illustrated in the pseudo code of FIG. 13 is produced for each m×n multi-level template in the template library. FIG. 14 is a schematic illustration of this data structure. It is evident that other types of data structures that provide equivalent access to the necessary data may be used in place of the data structure in illustrated in FIG. 14.

d. Computing Heuristic Scores for Text Line Image Decoding

Figure 15:
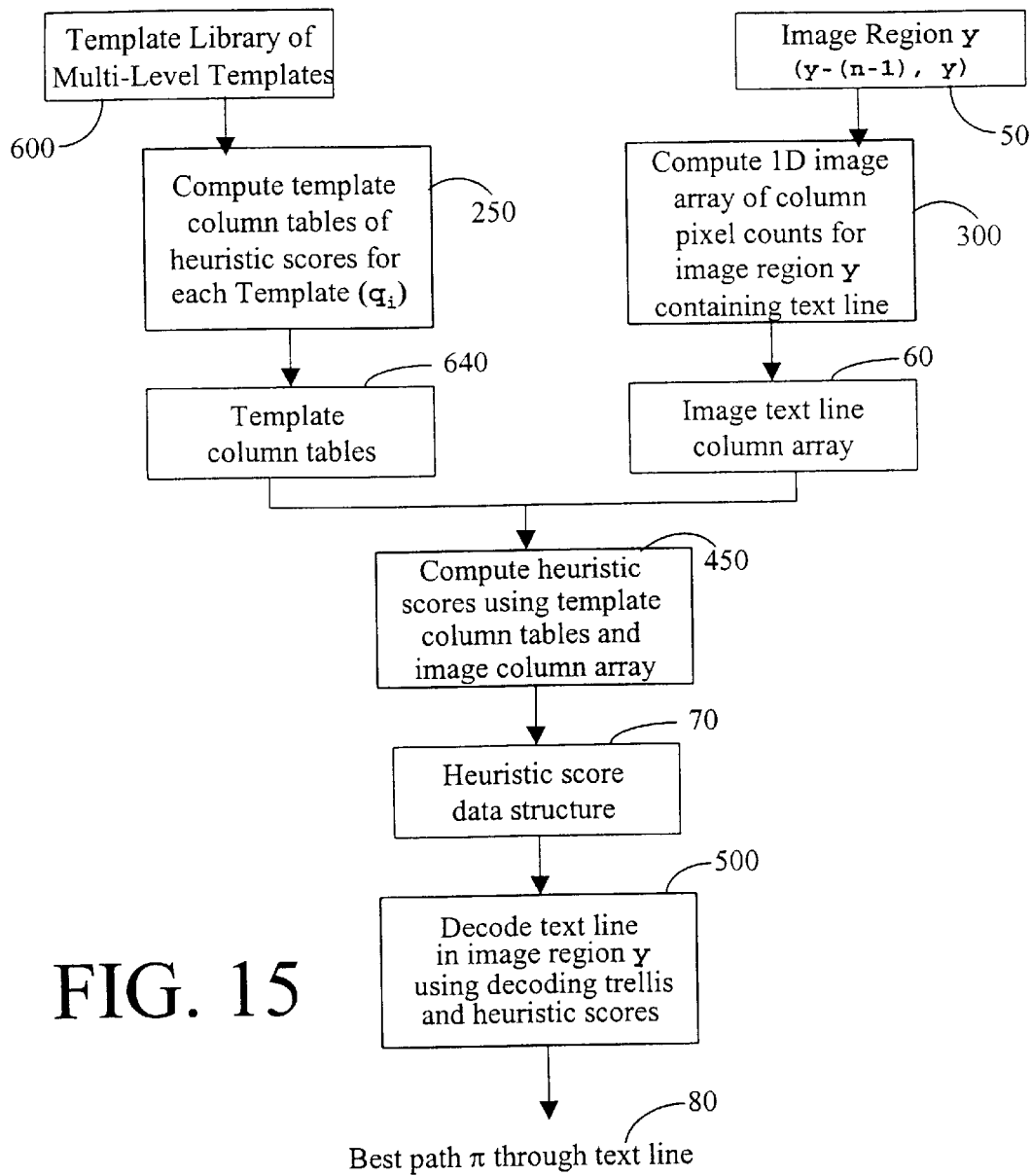
FIG. 15 is a flowchart illustrating the use of column-based heuristic scoring for decoding an image text line according to a second embodiment of the present invention that uses multi-level character templates.
Figure 28:
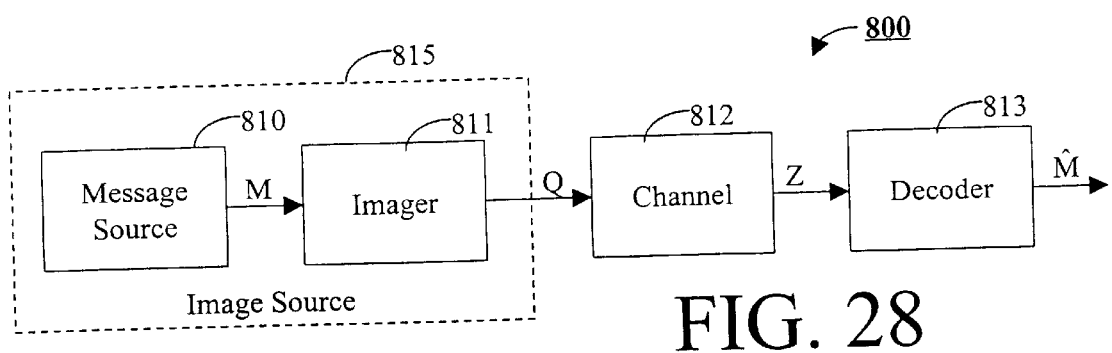
FIG. 28 is a block diagram illustrating the document recognition problem according to classical communications theory, which provides the framework for understanding the context of the technique of the present invention.
Figure 29:
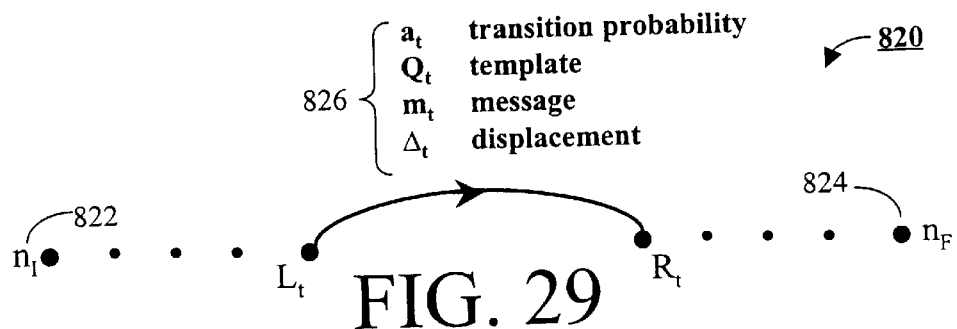
FIG. 29 is a schematic illustration of a general Markov source model that models a text image as a stochastic finite-state grammar represented as a network of nodes and transitions into the nodes.

The major processes of the column-based heuristic scoring technique for multi-level templates are similar to those described in FIG. 5 for bi-level templates. FIG. 15 is a block diagram showing operations 250, 300 and 450 and illustrating input and output data structures for computing the heuristic scores needed to decode a text line image when the stochastic finite state network uses multi-level templates. Operation 450 which computes the heuristic scores for a specific image region of the observed image is very similar in operation to operation 400. The pseudo code for operation 450 is shown in FIG. 16. The notable difference is in computing an individual template-image heuristic score, where a table lookup is performed at line 452 to retrieve the score element for a column instead of taking the minimum of the template column pixel count and the image column pixel count. As in the case of bi-level templates, operation 450 produces a k×w output scores array, where k is the total number of templates in the source model, and w is the width of the image text line, or portion thereof, being decoded. A column-based heuristic score is computed for every template at every image position i of the image text line, and all scores are stored for use by the dynamic programming decoding operation.

4. Column-based Heuristic Scoring Using Sub-sampling Techniques

The discussion in Section 5 below indicates that the use of column-based heuristic scores during text line decoding results in modification to the Viterbi decoding process. Specifically, decoding of the text line is repeated until the heuristic scores of all nodes found on the best path have been replaced with actual scores, or until a current path and a previous path are identical. Thus, some of the computational efficiency achieved through the use of the column-based heuristic scores just described is offset by the need for additional iterations of decoding the text line. Because the heuristic scores as designed provide very good upper bound scores, the offset in computational efficiency that results from the additional text line decoding iterations is acceptably small in view of the efficiency gained by the use of the simpler computations involved in column-based heuristic scoring. There is, therefore, a balance to be maintained between the efficiencies gained from using simpler scoring methods and the efficiency lost by the resulting increase in the number of iterations of the dynamic programming process.

This experimental observation leads to a further observation: column-based heuristic scores could be designed to be somewhat less rigorous upper bounds in order to reduce computation time still more if the resulting increase in the number of iterations of the dynamic programming process was acceptable. In effect, the upper bound heuristic scores could be somewhat "looser" as upper bounds on the actual score and achieve even greater computational efficiencies in the overall time needed to decode a text line than the use of the more rigorous column-based heuristic scores just described above. This second category of column-based heuristic scoring is referred to as sub-sampled column-based heuristic scoring. The column-based heuristic scores that are the less rigorous upper-bound heuristic scores than those produced using the template column arrays and the image text line column arrays described above are referred to as sub-sampled heuristic scores. A description of two types of sub-sampled heuristic scores for standard bi-level templates now follows. The extension of these processes to multi-level templates is also discussed.

a. Computing Template Column Arrays having Multiple Column Sums of Template Pixel Counts In the embodiment of the present invention illustrated in FIG. 6 through FIG. 11, computing the heuristic scores involves taking a minimum at every entry in the template column array and summing these minimums to produce a single score. Computation of a single heuristic score can be reduced by a factor of 2 if only half as many comparisons and sums were required between the template and image column arrays. This can be achieved by producing template column arrays and image column arrays that include foreground pixel counts that are sums of the foreground pixels in two adjacent pixel columns.

FIG. 17 schematically illustrates a 1D template pixel sums data structure 86, showing how groups of two column pixel counts in template column array 46 are summed together to produce a single, combined column pixel count. A 1D template pixel sums data structure is produced for each character template. In the figure, data structure 86 is shown to be the same 1×m data structure as data structure 46. In one implementation of this embodiment, the template column arrays of FIG. 6 are first computed and then adjacent counts of column foreground pixels are summed and stored in half as many entries (i.e, every other entry) of the template column array data structure. Template pixel sums data structure 86 may be referred to as a half resolution array because it contains only half as many pixel count sums as are contained in the original template column array 46. Other implementations are clearly possible, however. For example, template pixel sums data structure 86 could simply be an array of size 1×m/2, and it could be computed directly from template 22, without producing template column array 46 first. FIG. 18 shows the pseudo code for producing template image sum array 86 as shown in FIG. 17.

b. Computing an Image Text Line Column Array Having Sums of Multiple Column Pixel Counts FIG. 19 schematically illustrates how a 1D image pixel sums data structure 90 is produced. Every two adjacent column pixel counts, such as column pixel counts 92, in image column array 60 are summed together to produce a single, combined column pixel count, such as combined column pixel count 93, in 1D image pixel sums data structure 90. Note that each combined count in the image pixel sums data structure represents the sum of overlapping pairs of adjacent column pixel counts in the image column array 60, while the combined column pixel counts produced for the templates use non-overlapping groups of adjacent columns. Image pixel sums data structure 90 has the same 1×w size as data structure 60; sums of overlapping pairs of adjacent column pixels produce a combined column pixel count for each image position. Thus, data structure 90 may be referred to as a full resolution array. In one implementation of this embodiment, the image column array of FIG. 7 is first computed and then adjacent counts of column foreground pixels are summed and stored in a new image pixel sums data structure. Other implementations are clearly possible. For example, image column array 60 could simply be reused. FIG. 20 shows the pseudo code for producing 1D image pixel sums data structure 90 as shown in FIG. 19.

c. Computing Type 1 Sub-sampled Column-based Heuristic Scores for Text Line Image Decoding Using Half-resolution Template Column Arrays FIG. 21 schematically illustrates how sub-sampled column-based heuristic scores are produced using the data structures illustrated in FIG. 17 and FIG. 19. Each template pixel sums data structure representing a character template is matched at every position in the input image, which results in each template pixel sums data structure being matched at every entry in image pixel sums data structure 90. However, in contrast to the operation for producing heuristic scores shown in the pseudo code of FIG. 11 where every column pixel count in the template column array is compared with the same number of image column counts, only the combined column pixel counts in the template pixel sums data structure are matched with corresponding combined pixel count sums in the image pixel sum data structure to determine the minimum pixel count. Then, these minima are summed to produce a score.

FIG. 21 shows the production of two heuristic scores 82 and 84 for the character template represented by data structure 86. Each of the combined template column pixel counts in template pixel sums array 86 is matched with a combined column pixel count for the corresponding two image columns in image pixels sums array 90. After score 82 is produced for the position labeled $IS_i$, template pixel sums array 86 moves to the right one array entry position to compute the heuristic score 84 at the next image position $IS_{i+1}$. FIG. 22 shows the pseudo code for computing the heuristic scores as shown in FIG. 19. It can be seen that only half as many minima and sums are performed using the sub-sampled template pixel sums array 86. Thus, a reduction of a factor of 2 in computation is achieved using this sub-sampling variation of computing the heuristic scores. This computation reduction may be referred to as a template reduction.

The premise for using these sub-sampled heuristic scores as upper-bound heuristic scores in place of actual template-image matching scores for decoding purposes is that the sum of the minimum scores between the image and template sums of column counts, which is the original heuristic score computation described in FIG. 11, is less than or equal to the minimum between the sums of adjacent column counts. Thus, this template reduction method for computing heuristic scores is clearly an upper bound on the actual score.

d. Computing Type 2 Sub-sampled Column-based Heuristic Scores for Text Line Image Decoding Using Template Column Array Reductions and Image Column Array Reductions If a reduction of a factor of 2 in the computation of heuristic scores can be achieved using the template reduction method, it is logical to attempt to achieve an even larger reduction by eliminating the need to compute a heuristic score at every image position i in the text line image. This can be achieved by finding an upper bound heuristic score that can be computed for one image position and then directly used as the upper bound heuristic score for a next adjacent image position. FIG. 23 through FIG. 26 illustrates the process for computing such a score. First, FIG. 23 schematically illustrates the process for producing a new image pixel sums array 96. Image pixel sums array 96 is a half-resolution array; that is, there is a single, combined column pixel count for every two image columns in the image text line. In FIG. 23 array 96 is shown as being a full resolution array with combined pixel column count entries 95 in every other position in the array. Persons of skill in the art will recognize that other implementations are clearly possible. For example, array 96 may have dimensions 1×w/2, half the size of array 60 or array 90.

Array 96 is produced as follows. Each of two pairs 92 and 94 of overlapping adjacent column pixel counts is summed to produce a single, combined column pixel count. Then the maximum combined column pixel count of these two combined column pixel counts is determined and stored in image pixel sums array 96, representing a combined column pixel count for two image positions. FIG. 24 shows the pseudo code for producing image pixel sums array 96 according to one implementation.

FIG. 25 shows a schematic illustration of the process for computing upper bound column-based heuristic scores using both half-resolution arrays 96 and 86. Since both arrays are half resolution, each combined column pixel count entry in template pixel sums array 86 is compared with each combined column pixel count entry in image pixel sums array 96, a minimum of the two combined column pixel counts is determined, and all minima are summed to produce the heuristic score for a first image position labeled $ISM_i$. Then, this heuristic score is simply repeated for the next image position with no computation, and template pixel sums array 86 is moved to the right to the next array position labeled $ISM_{i+2}$ to compute the next image position score.

FIG. 26 shows the pseudo code for computing the heuristic scores as shown in FIG. 25. It can be seen that only half as many minima and sums are performed using the sub-sampled template pixel sums array 86, and that a heuristic score is computed for only half of the image positions. Thus, a reduction of a factor of 4 in computation is achieved using this sub-sampling variation of computing the heuristic scores. This computation reduction may be referred to as an image and template reduction.

e. Computing Sub-sampled Heuristic Scores for Text Line Image Decoding Using Multi-level Templates The concepts and processes of template and image reductions just described may also be applied to producing scores for multi-level templates. First, the discussion of column-based heuristic scoring for multi-level templates that accompanies FIG. 12 through FIG. 16 above is briefly reviewed. A template column array for a multi-level template, schematically illustrated in FIG. 14, consists of a set of m lookup tables, where m is the column width of the template and there is one lookup table for each column of the template. A lookup table is indexed by an image pixel count and each entry contains a maximum pixel count score for that image pixel count, produced by distributing foreground and background pixels in various levels of the template, according to the algorithm shown in FIG. 13. Computing a heuristic score for a multi-level template column array requires summing pixel count scores that are looked up in and retrieved from the multi-level template column array according to the image column pixel counts in image column array 60.

To produce a heuristic score for multi-level templates using the template reduction method described above, a lookup table for a pair of adjacent template columns is produced in the same manner as described in the algorithm shown in FIG. 13. That is, the total foreground pixel counts assigned to each template level is the sum of the pixels in the individual columns assigned to those levels. Similarly, if the height of a template is n pixels, then the total number of pixels from two adjacent columns in the image to be distributed among the template levels is 2n. The number of lookup tables is reduced to ½m, and the height of each lookup table is 2n. A heuristic score is computed for each template by producing the sum of the pixel count scores looked up and retrieved from each lookup table using the combined column image pixel counts of image pixel sums array 90 of FIG. 19.

It was found through experimental observation that the image reduction method of producing column-based heuristic scores does not produce a true upper bound when multi-level templates include a "write-white" template level indicating locations of pixels in the character image that are expected to be white. Otherwise, however, in the case when all levels of the multi-level template apart from the background level are black levels, the image reduction method of computing heuristic scores may also be implemented for multi-level templates. The implementation is based on the above discussion of the extension of the template reduction method to multi-level templates, and on the discussion accompanying FIG. 23 through FIG. 26 above, and is straightforward.

f. Extending Column Sub-sampling from a Factor of 2 to a Factor of n

The foregoing embodiments related to producing heuristic scores by combining ON pixel counts in adjacent columns of the image and the templates were described in terms of reducing computations by a factor of n=2, in case of using only the template reduction, or by a factor of 4 in the case of using both template and image reductions. The methodology can be generalized to show how to improve the efficiency of computing heuristic scores by a factor of n by combining more than 2 columns of ON pixel counts, thereby producing a "looser" upper bound heuristic score for a template-image match.

To compute an upper bound heuristic score at each pixel position i in the image, let $I_j^{nf}$ designate the full-resolution image array (i.e., a 1×w array, where w is the width of the text line image region or portion thereof being decoded) produced by combining columns of ON pixel counts. Form $I_j^{nf}$ as follows:

$$I_j^{nf} = I_j + I_{j+1} + \ldots + I_{j+n-1}, j=0, 1, 2, \ldots \quad (4)$$

Let $T_j^{nn}$ designate the half-resolution image array (i.e., a 1×½m array, where m is the width of a template) produced by combining columns of ON pixel counts. Form $T_j^{nn}$ as follows:

$$T_j^{nn} = T_j + T_{j+1} + \ldots + T_{j+n-1}, j=0, n, 2n, \ldots \quad (5)$$

Then, an upper bound heuristic template image match score may be computed by the following, $$S^n(i) = \sum_{j=i,i+n,\ldots}^{i+w-n} \min(I_j^{nf}, T_j^{nn}) \quad (6)$$

where the computations (i.e., the min and sums) for an individual score are taken only at every nth pixel position i, and a heuristic score for a given template is computed at every pixel position i. This score, previously designated as the Type 1 score, was illustrated for n=2 in FIG. 17 through FIG. 22 above.

To compute an upper bound heuristic score only at every nth pixel position i in the image, form a full-resolution image array different from the image array of Equation (4). Let $I_j^{nn}$ designate the full-resolution image array produced by combining columns of ON pixel counts. Form $I_j^{nn}$ as follows:

$$I_j^{nn} = \max_{k=0,1,\ldots n-1} \left( \sum_{l=0}^{l<n} I_{j+k+l} \right), j=0, n, 2n, \ldots \quad (7)$$

Then, using the same template data structures formed by $T_j^{nn}$, an upper bound heuristic template image match score may be computed by the following, $$S^{n \times n}(i) = \sum_{j=i,i+n,\ldots}^{i+w-n} \min(I_j^{nn}, T_j^{nn}) \quad (8)$$

and this score may be used as the upper bound heuristic score for this template at image positions, i, . . . , i+n−1. This score, previously designated as the Type 2 score, was illustrated for n=2 in FIG. 23 through FIG. 26 above.

5. Modifications to the Dynamic Programming Operation Resulting from Using the Heuristic Column-based Scoring Technique The major functions of decoding a text line image using the Viterbi procedure with column-based heuristic scoring are illustrated in the flowchart of FIG. 27. Decoding using heuristic scores typically requires several iterations. A decoding iteration produces an estimated best path of nodes through the text line, in box 510. The transitions between the nodes of this best path indicate character labels that comprise the estimated message (transcription) of the text line. Because heuristic scores are used for decoding, this message string is not necessarily the correct transcription of the text line after a single Viterbi iteration. A consequence of using column-based heuristic scoring during decoding is an increase in the number of iterations of Viterbi decoding that take place to accurately decode a text line. In addition, it is also necessary to perform several additional tasks prior to beginning a next Viterbi iteration.

First, actual template-image matching scores are computed for the nodes identified as part of the estimated best path, in box 530. This process is referred to as re-scoring the best path. This computation of actual scores is relatively insignificant, since re-scoring is done only for text line positions of the identified nodes, not all W text line positions, and only for the character template identified by the label of the transition into a node, not for all templates at all node positions.

Then, when re-scoring of the nodes of the estimated best path is completed, each template identified as part of the estimated best path is matched with the text line image at several different vertical (y) positions at the same x position of the node, in box 540. An actual template-image matching score is produced for each y image position. The largest actual score computed for the template indicates the y image position for the node. Computing scores at different vertical positions is somewhat analogous to what is done in the case of 2D Viterbi decoding using actual scores or the heuristic scores described in the '444 ICP patent (i.e., computing scores at five different vertical positions), but here testing for the best baseline is done on a character-by-character basis. Only actual scores for a single template at each node position along the estimated best path are computed to determine the best location for the baseline.

Then, Viterbi decoding of the text line is repeated, in box 510, using the actual scores of the re-scored nodes of previously estimated best paths, and using the column-based heuristic scores for all other image positions. Decoding of a text line is iterated until either all nodes along the best path have been re-scored or until the best path of a current Viterbi iteration is the same as the best path found from the prior iteration, as tested in box 548.

Experimental observation of line decoding using column-based heuristic scoring showed that several of the Viterbi iterations resulted from an anomaly in some of the column-based heuristic scores for a template that has been determined to be in the estimated best path in a prior Viterbi iteration. Such a template would have its heuristic score replaced by its actual score as part of the re-scoring task after a prior iteration, as just described above. The heuristic scores for the same template at x positions that are near (e.g., within one to pixel positions on either side of) the current node position of the re-scored template exceed the template's actual score. This anomaly results because, when there is an actual template-image match on the text line, the heuristic scores for the matching template at x positions adjacent to the best template position on the text line are likely to be nearly as high as the actual score for the matching template at the best template position. When the heuristic scores at adjacent positions exceed the template's actual score, the Viterbi decoder performs extra iterations through these adjacent node positions, identifying them as being on the best path, and re-scoring these heuristic scores to actual scores that are lower than the template's actual score for the best matching position.

In order to avoid these extra Viterbi iterations, another post-iteration computation task is added. For each node identified as being on the current estimated best path, during the re-scoring task, an actual template-image score is computed for each of a span of x pixel positions on the text line around the x position identified as the best matching node position. Using these actual scores in the next Viterbi iteration should prevent the occurrence of the heuristic score anomaly described above. A total of five x positions is suggested as being sufficient to eliminate this problem.

6. Implementation Notes a. Decoding Efficiency Improvements

The computational efficiencies generated by substituting column-based heuristic scoring for actual template-image matching scoring are significant. Experimental results show an overall reduction in computation time by a factor of 40 for decoding a text line using column-based heuristic scoring in a full-page (2D) Viterbi decoder. This gain is achieved in two parts. First, experimental results show a reduction in computation time by a factor of 8 needed to decode a single text line, largely due to reductions from computing heuristic scores instead of actual scores for line decoding. Second, column-based heuristic scoring eliminates the need to produce actual template-image matching scores for five vertical baseline positions, as is required in full-page (2D) Viterbi decoding because the actual baseline is not known. Column-based heuristic scoring automatically gives an upper bound for the best possible vertical position of the baseline.

b. Additional Implementation Notes

In an implementation of DID decoding of a full page (2D) document using a source model similar to model 830 of FIG. 30 and using the column-based heuristic decoding of the present invention, it was found that performing the computation of heuristic scores prior to decoding was preferred. Template analogue data structures, such as data structure 40 of FIG. 6 or data structure 86 of FIG. 17, were computed and stored once for use in decoding all input text lines. Text line baselines in the image were identified using the decoding method disclosed in the '444 ICP patent. The image analogue data structure, such as data structure 60 of FIG. 7 or data structure 90 of FIG. 19, for all potential text lines were also pre-computed. All column-based template-image heuristic scores were then computed and stored prior to the start of decoding.

In general, when an operation calls for some even or odd number of pixel columns either in the image text line, in a template data structure, in the template analogue data structures, or in the image analogue data structures, and the requisite number of pixel columns is unavailable, the data structure in question is either extended to the requisite length by padding with zeros or is truncated to the requisite length, as necessary to facilitate the computation. For example, when producing sub-sampled column-based heuristic scores of the type illustrated in FIG. 25, which uses image column array 60 as shown in FIG. 23, the operation requires that the number of of entries in image column array 60 be divisible by four so that two pairs of column pixel counts can be used to generate a single entry in the output data structure 96. Image column array 60 may be extended with entries having values of zero or truncated to the requisite number of entries so that the computation can be performed. Truncation or padding applies to any one of the embodiments of column-based heuristic scores described above.

Document image decoding may be implemented using conventional image processing methods to locate the baselines of text lines. After an input image has been de-skewed and text blocks and text lines have been identified, text line baselines can be identified using horizontal pixel projections of the text line. One such method is as follows: compute the horizontal pixel projection array for the image region containing the text line, and derive from this array an array including entries for the differential of the scan line sums, where the i-th entry in this array is the difference between the number of pixels in the i-th row and i+1-th row. Assuming the convention that the pixel rows are numbered from top to bottom, the baselines are easily observed as a negative spike in the differential scan line sums. More information on this method of locating baselines may be found in reference [8].

c. Heuristic Column-based Scoring in Text Line Decoders

The heuristic scoring technique of the present invention is directed to improving the computational efficiency of an image recognition process that decodes one or more lines of text, where a line of text is modeled as a stochastic finite-state network, and where a Viterbi or Viterbi-like algorithm is used to perform recognition of the text line characters. Thus, the inventive technique herein may be used in implementations of DID that use stochastic finite-state networks such as the Markov source 830 of FIG. 30 that model a full page of text. In those implementations, the technique may be incorporated as part of the decoding of individual text lines during the decoding of the full document page. For example, with respect to image source 830 (FIG. 30), the heuristic scoring technique of the present invention may be used in place of actual template-image matching scoring during decoding of self-transitions 831 at node $n_2$.

The inventive technique may also be used in image recognition systems in which the stochastic finite-state network models only a single line of text. Such a model is illustrated by way of example as image source model 840 in FIG. 31. Image source model 840 is a simple source model for the class of document images that show a single line of English text in 12 pt. Adobe Times Roman font. A single text line model in this context is referred to as a one-dimensional model, in contrast to model 830 of FIG. 30 which models a full page of text and so is referred to as a two-dimensional model. In model 840, documents consist of a single horizontal text line composed of a sequence of typeset upper- and lower-case symbols (i.e., letter characters, numbers and special characters in 12 pt. Adobe Times Roman font) that are included in the alphabet used by the English language. The image coordinate system used with the class of images defined by model 840 is one where horizontal movement, represented by x, increases to the right, and there is no vertical movement in the model. The left edge of the image is at x=0, and the right edge of the image is at x=W, where W indicates the width of the image in pixels. Markov source model 840 has initial state node $n_I$, "printing" state node $n_1$, and final state $n_F$. At node $n_1$ there are three different types of transitions indicated by loops 842, 844 and 846, with each transition shown labeled with its attributes. The attributes of transition 842 include a probability (0.4) and a horizontal displacement of 1 pixel. This transition allows for the addition of a small amount of spacing (i.e., one pixel at a time) between character templates along the horizontal text line. Transition 844 allows for the placement of a full space along the horizontal text line. The attributes of transition 844 include a probability of 0.4, the label 845 for the space character, and a horizontal displacement along the horizontal text line of set width $W_s$. Finally, the group of self-transitions 846 accommodates all of the character templates included in model 840. The attributes of each transition $t_m$ of transition group 846 include a probability based on the total number, m, of character templates Q, the character label 848 associated with an individual template 849, and a horizontal displacement $W_m$ along the horizontal text line indicating the set width 847 of the character template.

As with model 830, Markov source model 840 of FIG. 31 serves as an input to an image synthesizer in the DID framework, which places character templates in positions in a single horizontal line under control of image source model 840. The movement of the imager follows the assumptions for the conventional reading order for a single line of text in the English language. From the initial state at node $n_I$ at the left edge of the image, the imager automaton transitions to node $n_1$ in preparation for placing character templates at the beginning of a horizontal text line. The imager proceeds through iterations of the self-transitions at node $n_1$ horizontally from left to right, through transitions 842, 844 and 846. The imager moves to the right by a displacement of 1 pixel at a time through transition 842 to introduce fine spacing on the text line. The imager moves to the right by the displacement $W_s$ through transition 844 to introduce a space on the text line. The imager places a character template 849 on the text line and then moves through transition 846 by the set width 847 of the template to the next position on the line. The imager moves along the text line until there are no more characters to be printed on the line or until the imager has reached the right end of the line, when the imager transitions to the final node $n_F$. Decoding a text line image produced by the imager of model 840 involves finding the most likely path through model 840 that produced the text line. The column-based heuristic scoring technique of the present invention may be used in place of actual template-image matching scoring when decoding the text line using the Viterbi-based decoder.

7. The Machine and Software Product of the Invention

Figure 32:
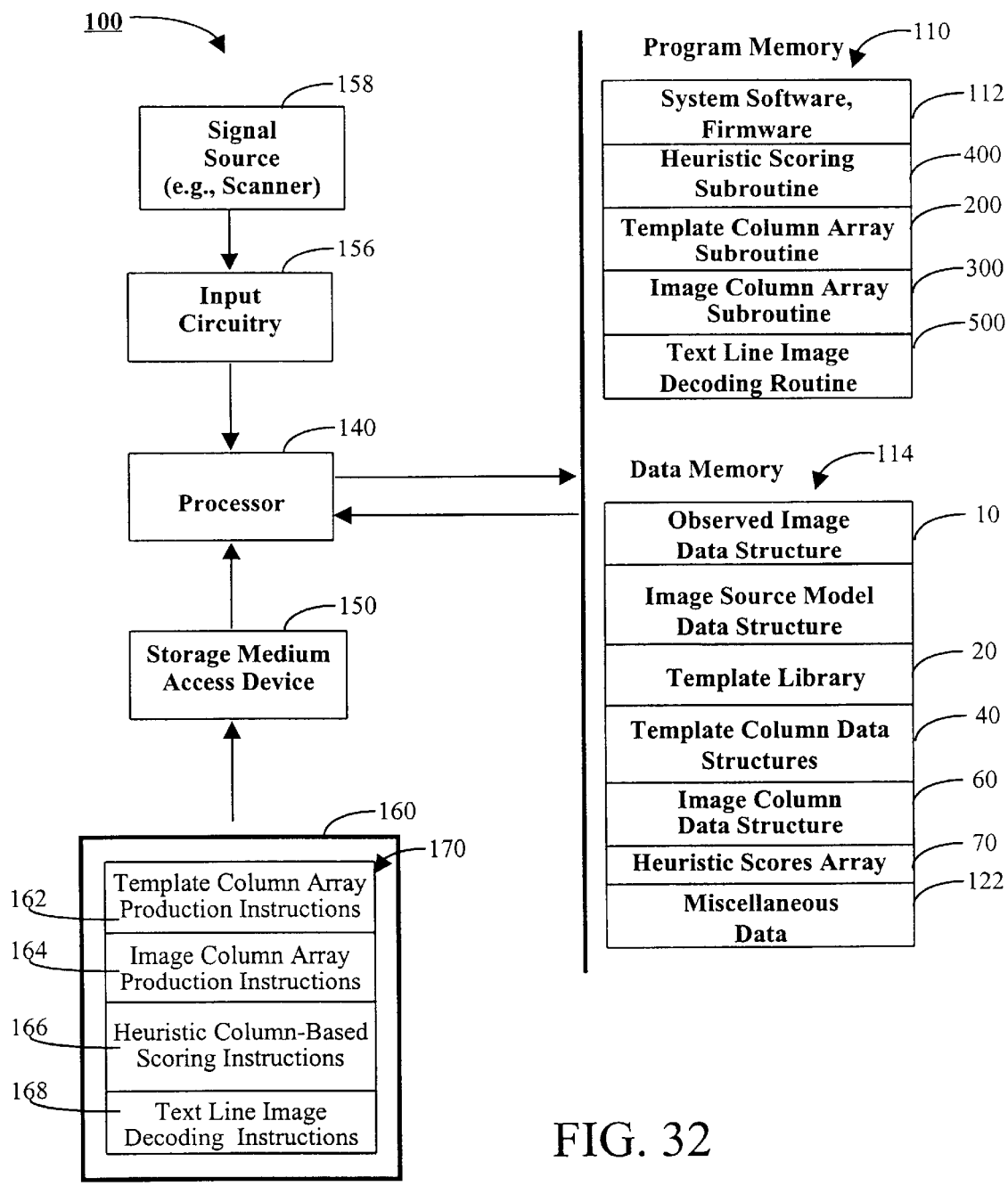
FIG. 32 is a simplified block diagram illustrating a suitably configured machine in which the present invention may be used, and further illustrating the software product of the present invention and its use in conjunction with the machine.

FIG. 32 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody the present invention, the machine is not a standard or known configuration.

Machine 100 may be configured to perform operations 200, 300, 400 and 500 of FIG. 5 to compute column-based heuristic scores using template column arrays and an image region column array, and to perform text line image decoding using the heuristic scores. Alternatively machine 100 may be configured to perform operations 250, 300, 450 and 500 of FIG. 15 to compute column-based heuristic scores using the template score tables produced for multi-level templates. An input observed image, such as image 10 of FIG. 1, is provided from signal source 158. Signal source 158 may be an image scanner, a memory device, a communications channel, a data bus, another processor performing an operation, or any other suitable source of bitmapped image signals. For example, signal source 158 may be an image capture device, such as a scanning device, a digital camera, or an interface device that produces a digital image definition data structure from another type of image signal. An input image provided by signal source 158 is forwarded via input circuitry 156 to processor 140 and may be stored in data memory 114. Machine 100 may, but need not, include a conventional display device (not shown) capable of presenting images, such as a cathode ray tube, a liquid crystal display (LCD) device, a printing device, or any other device suitable for presenting images.

Processor 140 operates by accessing program memory 110 to retrieve instructions, which it then executes. When machine 100 is configured to perform operations 200, 300, 400 and 500 to produce a transcription from an input text line image using the heuristic scoring technique generally illustrated in FIG. 5, program memory 110 includes text line decoding instructions 500 that implement operation 500 of FIG. 5 for performing text line decoding using column-based heuristic scoring. Program memory 110 includes subroutine 200 for producing the template column arrays 40 according to the pseudo code illustrated in FIG. 8. Program memory 110 also includes subroutine 300 for producing image column array 60 according to the pseudo code illustrated in FIG. 9. Program memory 110 further includes subroutine 400 for producing the heuristic column-based scores 70 for use by text line decoding routine 500, according to the pseudo code illustrated in FIG. 11. When machine 100 is configured to perform operations 250, 300 and 450, as shown in FIG. 15, program memory 110 includes subroutine 250, for producing template score tables 640 according to the pseudo code illustrated in FIG. 13, and subroutine 450, for producing the heuristic column-based scores 70 for use by text line decoding routine 500, according to the pseudo code illustrated in FIG. 16.

During execution of the instructions, processor 140 may access data memory 114 to obtain or store data necessary for performing its operations. For example, when machine 100 is configured to perform operations 200 and 300, processor 140 accesses template library 20 and observed input image 10 in data memory 114 in order to perform operations 200 and 300. Processor 140 then stores the resulting template column arrays 40 and image column array 60 in data memory 114. Data memory 114 also stores a stochastic finite state network that represents an image source model, such as the full page image source 830 of FIG. 30 or the line image source 840 of FIG. 31. Data memory 114 also stores various other miscellaneous data such as data needed by text line decoding routine 500. When multi-level templates are used in the image source model, data memory 114 stores template library 600 of multi-level templates of the type illustrated in FIG. 12.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.) Machine 100 may also include a user-controlled input signal device (not shown) for sending signals to processor 140 to initiate the operations of FIG. 5 for an input image 10. Such an input device may be connected to processor 140 by way of a wired, wireless or network connection.

FIG. 32 also shows software product 160, an article of manufacture that can be used in a machine that includes components like those shown in machine 100. Software product 160 includes data storage medium 170 that can be accessed by storage medium access circuitry 150. Data storage medium 170 stores instructions for executing operations 200, 300, 400 and 500 of FIG. 5, or instructions for executing operations 250, 300, 450 and 500 of FIG. 15. Software product 160 may be commercially available to a consumer in the form of a shrink-wrap package that includes data storage medium 170 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 170 is inserted in order for the storage medium access circuitry to access the data stored thereon. Examples of storage medium access devices include disk drives, CD-ROM readers, and DVD devices. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 170 when data storage medium 170 is stored as part of a remotely-located storage device, such as a server. Software product 160 may be commercially or otherwise available to a user in the form of a data stream indicating instruction data for performing the method of the present invention that is transmitted to the user over a communications facility from the remotely-located storage device. In the latter case, article 160 is embodied in physical form as signals stored on the remotely-located storage device; the user purchases or accesses a copy of the contents of data storage medium 170 containing instructions for performing the present invention, but typically does not purchase or acquire any rights in the actual remotely-located storage device. When software product 160 is provided in the form of a data stream transmitted to the user over a communications facility from the remotely-located storage device, instruction data stored on data storage medium 170 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

FIG. 32 shows data storage medium 170 configured for storing instruction data for performing operations 200, 300, 400 and 500 (FIG. 5). This instruction data is provided to processor 140 for execution when text line decoding using column-based heuristic scoring is to be used. The stored data includes template column array production and image column array production instructions 162 and 164, respectively; when these instructions are provided to processor 140, and processor 140 executes them, the machine is operated to perform the operations for producing template column arrays 40 and image column array 60, as represented in the pseudo code of FIG. 8 and FIG. 9. For example, the stored data include template column array production instructions 162. When instructions 162 are provided to processor 140, processor 140 executes them, causing the machine to perform the operations for producing for each template in template library 20 a template column array indicating the ON pixels in that template, as represented in the pseudo code of FIG. 8. The stored data shown also include image column array production instructions 164; when these instructions are provided to processor 140, and processor 140 executes them, the machine is operated to perform the operations for producing an image column array, as represented in the pseudo code of FIG. 9.

With continued reference to FIG. 32, the data stored on data storage medium 170 further includes instruction data 166 indicating heuristic scoring instructions for producing column-based heuristic scores using the template column arrays and image column array. When these instructions are provided to processor 140, processor 140 executes them, causing the machine to perform heuristic scoring operation 400, as represented in the pseudo code of FIG. 11. The data stored on data storage medium 170 further includes text line decoding instruction data 168 indicating instructions for decoding a text line image using the heuristic column-based scores. When these instructions are provided to processor 140, and processor 140 executes them, the machine is operated to perform operation 500 of FIG. 5.

An embodiment of the present invention has been implemented as a software program on a Sun UltraSparc machine running the Sun Solaris operating system, available from Sun Microsystems, Inc. of Mountain View, Calif. The system was configured with 256 MB RAM memory and a disk swap space of 1 GB. The software program is written in the ANSII C programming language, using a compiler obtained from Sun Microsystems. A version has also been implemented on a PC configured with the Linux operating system and using the GCC compiler.

Implementation of the column-based heuristic scoring technique of the present invention as part of the Document Image Decoding text recognition system requires familiarity with the details of DID as disclosed in U.S. Pat. Nos. 5,321,773 and 5,526,444, and in references [3], [4] and [5] noted in the Appendix that follows below. Those references, in turn, presume an understanding of probability and decision theory as they relate to pattern-matching problems, and presume further a working knowledge and familiarity with the implementation of hidden Markov models for modeling the occurrence of a sequence of observable symbols. This knowledge is available from a number of texts and articles on these subjects, including the texts and articles by Huang et al. and Rabiner et al. listed as Other Publications in U.S. Pat. No. 5,689,620 and referenced therein at col. 35. The reader is directed to these references if further information is needed in order to implement the present invention in conjunction with the DID text recognition system.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

Appendix of Referenced Documents

[1] C. B. Bose and S. Kuo, "Connected and Degraded Text Recognition Using A Hidden Markov Model," 11<sup>th</sup> *International Conference on Pattern Recognition*, The Hague Netherlands, September 1992.

[2] F. Chen and L. Wilcox, "Wordspotting In Scanned Images Using Hidden Markov Models", 1993 *IEEE International Conference on Acoustics, Speech and Signal Processing*, Minneapolis, Minn., Apr. 27–30, 1993.

[3] P. Chou and G. Kopec, "A Stochastic Attribute Grammar Model Of Document Production And Its Use In Document Recognition," *First International Workshop on Principles of Document Processing*, Washington, D.C., Oct. 21–23, 1992.

[4] G. Kopec and P. Chou, "Document Image Decoding Using Markov Source Models, *IEEE Transactions on Pattern Analysis and Machine Intelligence*, Vol. 16, No. 6, June 1994, pp. 602–617.

[5] G. Kopec, "Row-Major Scheduling Of Image Decoders," *Technical Report P92-0006 (EDL-92-5)*, Xerox Palo Alto Research Center, Palo Alto, Calif., June 1992.

[6] A. Kam and G. Kopec, "Document image decoding by heuristic search," *IEEE Transactions on Pattern Analysis and Machine Intelligence*, Vol. 18, No. 9, September 1996, pp. 945–950.

[7] G. Kopec, "Multilevel Character Templates for Document Image Decoding," *Proceedings of SPIE, Document Recognition IV*, Vol. 3027, San Jose, Calif., February 1997, pp. 168–177.

[8] F. R. Chen, D. S. Bloomberg, and L. D. Wilcox, "Spotting phrases in lines of imaged text", *Proceedings of SPIE, Document Recognition II*, Vol. 2422, February 1995, pp. 256–269.

What is claimed is:

1. A method for operating a processor-controlled machine to decode a text line image; the machine including a processor and a memory device for storing data; the data stored in the memory device including instruction data the processor executes to operate the machine; the processor being connected to the memory device for accessing and executing the instruction data stored therein; the method comprising:

receiving an input text line image indicating a bitmapped image region including a plurality of image glyphs each indicating a character symbol;

obtaining a plurality of character templates and character labels stored in the memory device of the machine; each character template indicating a two-dimensional bitmapped image of a character symbol; each character template further indicating a character label identifying the character symbol represented by the character template;

producing a one-dimensional (1D) image analogue data structure using pixel counts of image foreground pixels in columns of the image portion of the input text line image;

producing a plurality of 1D template analogue data structures using pixel counts of template foreground pixels in columns of a respective one of the plurality of character templates;

computing a plurality of template-image heuristic scores using the 1D image analogue data structure and the plurality of 1D template analogue data structures; each template-image heuristic score indicating an estimated measurement of a match between one of the plurality of character templates and a two-dimensional region of the image portion of the input text line image; and performing a dynamic programming operation using a decoding trellis data structure indicating a stochastic finite state network including nodes and transitions between nodes indicating a model of expected spatial arrangements of character symbols in the input text line image; the dynamic programming operation using the plurality of template-image heuristic scores to decode the input text line image and produce the character labels of the character symbols represented by the image glyphs included therein.

2. The method of claim 1 for operating a processor-controlled machine to decode a text line image wherein producing the plurality of 1D template analogue data structures includes producing a 1D template pixel count data structure for each character template; each 1D template pixel count data structure indicating a plurality of counts of template column foreground pixels in respective columns in the character template;

producing the 1D image analogue data structure includes producing a 1D image pixel count data structure including a plurality of counts of image column foreground pixels in respective columns in the image portion; and computing each one of the plurality of template-image heuristic scores includes computing a sum of a plurality of minimum pixel counts; each minimum pixel count being the minimum of the count of the template column foreground pixels in a column of the character template and the count of the image column foreground pixels in a column of the image portion.

3. The method of claim 1 for operating a processor-controlled machine to decode a text line image wherein each character template includes at least two foreground template levels and a background template level; each foreground template level including a plurality of foreground pixels and indicating a template level weighting factor associated with the foreground template level;

each of the plurality of 1D template analogue data structures includes, for each of the foreground template levels of the character template, information indicating a foreground pixel template level column count for a respective one of the columns thereof weighted by the template level weighting factor associated therewith;

the 1D image analogue data structure is a 1D image pixel count data structure indicating a plurality of counts of image foreground pixels in respective columns of the image portion; and computing each one of the plurality of template-image heuristic scores includes computing a sum of a plurality of column pixel counts using the 1D image pixel count data structure and the 1D template analogue data structure.

4. The method of claim 3 wherein producing each of the plurality of 1D template analogue data structures includes producing a plurality of 1D template column lookup tables; each 1D template column lookup table representing data about at least one column of template pixels at all template levels of the character template; producing the plurality of 1D template column lookup tables including selecting a plurality of template columns; one column in each template level having a column location in common with all other template columns;

computing a template foreground pixel count of foreground pixels at each template level in the plurality of selected template columns;

for each image foreground pixel count of image foreground pixels, assigning the image foreground pixels to foreground template levels according to the template foreground pixel count at each template level, in decreasing order of the weighting factor associated with the template level until all image foreground pixels have been assigned;

multiplying the weighting factor associated with each template level by a number of foreground pixels assigned to that template level to produce a template level image score; and summing all template level image scores to produce an image pixel lookup score for the image foreground pixel count; and wherein computing each one of the plurality of template-image heuristic scores includes for a plurality of consecutive entries in the 1D image pixel count data structure each indicating a count of image foreground pixels, using the count of image foreground pixels to retrieve the image pixel lookup score from the plurality of 1D template column lookup tables; and summing the image pixel lookup scores to produce the template-image heuristic score.

5. The method of claim 1 for operating a processor-controlled machine to decode a text line image wherein producing the plurality of 1D template analogue data structures includes producing a 1D template pixel sums data structure for each character template; each 1D template pixel sums data structure indicating a plurality of combined template column counts of template column foreground pixels; each combined template column count indicating a count of foreground pixels in groups of at least two consecutive columns of the character template;

producing the 1D image analogue data structure includes producing a 1D image pixel sums data structure including a plurality of combined image column counts of image column foreground pixels; each combined image column count indicating a count of foreground pixels in groups of at least two adjacent column of pixels in the image portion such that the 1D image pixel sums data structure includes a combined image column count for every column of pixels in the image portion; and computing each of the plurality of template-image heuristic scores includes determining, for each combined template column count in the 1D template pixel sums data structure, a minimum of the combined template column count of the template column foreground pixels and the combined image column count of the image column foreground pixels; and summing the minima to produce the template-image heuristic score;

wherein computing the plurality of template-image heuristic scores includes computing one template-image heuristic score for each 1D template pixel sums data structure at each column position in the image portion.

6. The method of claim 1 for operating a processor-controlled machine to decode a text line image wherein producing the plurality of 1D template analogue data structures includes producing a 1D template pixel sums data structure for each character template; each 1D template pixel sums data structure indicating a plurality of combined template column counts of template column foreground pixels; each combined template column count indicating a count of foreground pixels in groups of at least two consecutive columns of the character template;

producing the 1D image analogue data structure includes computing a plurality of combined image column counts of image column foreground pixels to produce a 1D image pixel sums data structure; computing each combined image column count including producing a count of foreground pixels in at least every two adjacent column of the image portion;

determining a maximum count of foreground pixels for each pair of consecutive counts of foreground pixels; and storing the maximum count of foreground pixels as a combined image column count in the 1D image pixel sums data structure; the 1D image pixel sums data structure including a combined image column count for every other one of the columns of the image portion; and computing each of the plurality of template-image heuristic scores includes computing a first template-image heuristic score using the 1D template pixel sums data structure indicating a first character template at a first column position in the image portion; the computing step including determining, for each combined template column count in the 1D template pixel sums data structure, a minimum of the combined template column count of the template column foreground pixels and the combined image column count of the image column foreground pixels, and summing the minima to produce the template-image heuristic score; and assigning the first template-image heuristic score as the template-image heuristic score for the first character template at a next adjacent column position in the image portion;

wherein computing the plurality of template-image heuristic scores includes computing one template-image heuristic score for each 1D template pixel sums data structure at every other column position in the image portion.

7. The method of claim 1 for operating a processor-controlled machine to decode a text line image wherein each character template includes at least two foreground template levels and a background template level; each foreground template level including a plurality of foreground pixels and indicating a template level weighting factor associated with the foreground template level;

producing the plurality of 1D template analogue data structures includes producing a 1D template pixel sums data structure for each character template; each of the plurality of 1D template analogue data structures indicating, for each of the foreground template levels of the character template, information indicating a foreground template level combined column pixel count weighted by the template level weighting factor associated therewith; each foreground template level combined column pixel count indicating a count of foreground pixels in groups of at least two consecutive columns of the character template;

producing the 1D image analogue data structure includes producing a 1D image pixel sums data structure including a plurality of combined image column counts of image column foreground pixels; each combined image column count indicating a count of foreground pixels in groups of at least two adjacent column of pixels in the image portion such that the 1D image pixel sums data structure includes a combined image column count for every column of pixels in the image portion; and computing each one of the plurality of template-image heuristic scores includes for a plurality of entries in the 1D image pixel sums data structure, using the combined image column counts of image column foreground pixels to produce an image pixel score; and summing the image pixel scores to produce the template-image heuristic score;

wherein computing the plurality of template-image heuristic scores includes computing one template-image heuristic score for each 1D template pixel sums data structure at each column position in the image portion.

8. The method of claim 1 for operating a processor-controlled machine to decode a text line image wherein performing the dynamic programming operation includes determining an estimated best path through the decoding trellis using the plurality of template-image heuristic scores; and for each node on the estimated best path, computing an actual template-image matching score between the character template indicated by the character label and an image region indicated by the node;

re-scoring the node to indicate the actual template-image matching score in place of the template-image heuristic score; and repeating the dynamic programming operation until all nodes on the estimated best path indicate actual template-image matching scores;

the dynamic programming operation using the nodes on the best path to produce the character labels of the character symbols represented by the image glyphs.

9. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving an input text line image indicating a bitmapped image region including a plurality of image glyphs each indicating a character symbol;

the processor, further in executing the instructions, obtaining a plurality of character templates and character labels stored in the memory device of the machine; each character template indicating a two-dimensional bitmapped image of a character symbol; each character template further indicating a character label identifying the character symbol represented by the character template; and the processor, still further in executing the instructions, for each image, producing a one-dimensional (1D) image analogue data structure using pixel counts of image foreground pixels in columns of the image portion of the input text line image;

the processor, further in executing the instructions, for each image, producing a plurality of 1D template analogue data structures; each 1D template analogue data structure using pixel counts of template foreground pixels in columns of a respective one of the plurality of character templates;

the processor, further in executing the instructions, computing a plurality of template-image heuristic scores using the 1D image analogue data structure and the plurality of 1D template analogue data structures; each template-image heuristic score indicating an estimated measurement of a match between one of the plurality of character templates and a two-dimensional region of the image portion of the input text line image; and the processor, still further in executing the instructions, performing a dynamic programming operation using a decoding trellis data structure indicating a stochastic finite state network including nodes and transitions between nodes indicating a model of expected spatial arrangements of character symbols in the input text line image; the dynamic programming operation using the plurality of template-image heuristic scores to decode the input text line image and produce the character labels of the character symbols represented by the image glyphs included therein.

10. In an image recognition computer-implemented method for analyzing a bitmap text line image into a combination of character symbol templates selected from a library of templates on the basis of at least one complete path computed through a decoding trellis of a Markov source, the improvement comprising:

assigning a heuristic column-based template-image matching score to each transition in the decoding trellis according to a character symbol template associated with the transition; the heuristic column-based template-image matching score for a selected character symbol template indicating an estimated measurement of a match between one of the character symbol templates and a two-dimensional region of the bitmap text line image and being a substitute for an actual score; and performing a repeated sequence of a dynamic programming operation followed by a re-scoring operation until a stopping condition is met; the dynamic programming operation producing a complete path of nodes and transitions through the decoding trellis using the heuristic column-based template-image matching scores assigned to the transitions; the re-scoring operation assigning an actual score to each transition in the complete path having a heuristic column-based template-image matching score; the decoding trellis having the actual scores available to subsequent iterations of the dynamic programming operation.

* * * * *